US012784589B1

(12) United States Patent
Witriol et al.

(10) Patent No.: US 12,784,589 B1
(45) Date of Patent: Nov. 3, 2026

(54) UNIFIED MAP INTERFACE

(71) Applicant: Lytx, Inc., San Diego, CA (US)

(72) Inventors: Daniel Witriol, Kirkland, WA (US); Amir Sultan, Winnipeg (CA); Emily Yang, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 197 days.

(21) Appl. No.: 18/079,766

(22) Filed: Dec. 12, 2022

(51) Int. Cl.
*G08G 1/0967* (2006.01)
*G01C 21/00* (2006.01)
*G01C 21/34* (2006.01)

(52) U.S. Cl.
CPC ... *G08G 1/096741* (2013.01); *G01C 21/3461* (2013.01); *G01C 21/3807* (2020.08); *G01C 21/3833* (2020.08)

(58) Field of Classification Search
CPC .......... G08G 1/096741; G01C 21/3461; G01C 21/3807; G01C 21/2833
USPC ........ 701/117, 423, 533, 410, 119, 532, 118, 701/400, 414, 425, 1, 411, 468, 450, 301, 701/527, 300, 412, 28, 29.3, 409, 2
See application file for complete search history.

(56) References Cited

U.S. PATENT DOCUMENTS 8,984,445 B1 * 3/2015 Bailiang ............. G06F 3/04817 701/445
9,842,496 B1 12/2017 Hayward
11,436,777 B1 * 9/2022 Karli ...................... G06V 20/13
2009/0027418 A1 * 1/2009 Maru ...................... G06F 16/29 345/629
2015/0073695 A1 3/2015 Groves
2015/0193630 A1 * 7/2015 Von Kaenel ............ G06F 16/00 707/785
2019/0294159 A1 9/2019 Pedersen
2019/0377342 A1 * 12/2019 Panzica .................... G08G 1/20
2020/0269861 A1 8/2020 Liffman
2020/0269872 A1 8/2020 Cho
2020/0327710 A1 * 10/2020 Hong ...................... G06F 16/29
2021/0156705 A1 * 5/2021 Pietryka ................. B60K 35/00
2021/0280060 A1 9/2021 Rider
2022/0207977 A1 * 6/2022 Barkam ................. G08B 5/223
2023/0005372 A1 1/2023 Lindberg

* cited by examiner

*Primary Examiner* — Anne Marie Antonucci
*Assistant Examiner* — Jodi Jones
(74) *Attorney, Agent, or Firm* — Van Pelt, Yi & James LLP

(57) ABSTRACT

The present application discloses a method, system, and computer system for providing a unified map. The method includes (a) obtaining context information for one or more vehicles, (b) obtaining a plurality of hazard information from a data source, (c) determining whether one or more hazards are comprised in a predefined area, (d) in response to determining that the one or more hazards are within the predefined area, retrieving detailed location data from a subset of the one or more vehicles, the detailed location data comprising information pertaining to a location of the corresponding one or more hazards, (e) generating a unified map of the predefined area, the unified map including (i) vehicle indicators for the one or more vehicles at their respective current locations, and (ii) one or more hazard indicators for the one or more hazards, and (f) providing the unified map to a client via a user interface.

16 Claims, 20 Drawing Sheets

UNIFIED MAP INTERFACE

BACKGROUND OF THE INVENTION

Factors like weather, especially extreme weather, and traffic can have a large impact on the safe operation of a vehicle. However, identifying this weather and traffic information and accessing its risk in relation to your currently operating fleet vehicles today is difficult; the raw weather and traffic information is spread across many different and separate data sources. Further, because the information is separate and disparate, it is also difficult to determine how this information impacts vehicles that are currently on the road and to take steps to mitigate this risk.

BRIEF DESCRIPTION OF THE DRAWINGS

Various embodiments of the invention are disclosed in the following detailed description and the accompanying drawings.

DETAILED DESCRIPTION

Figure 1:
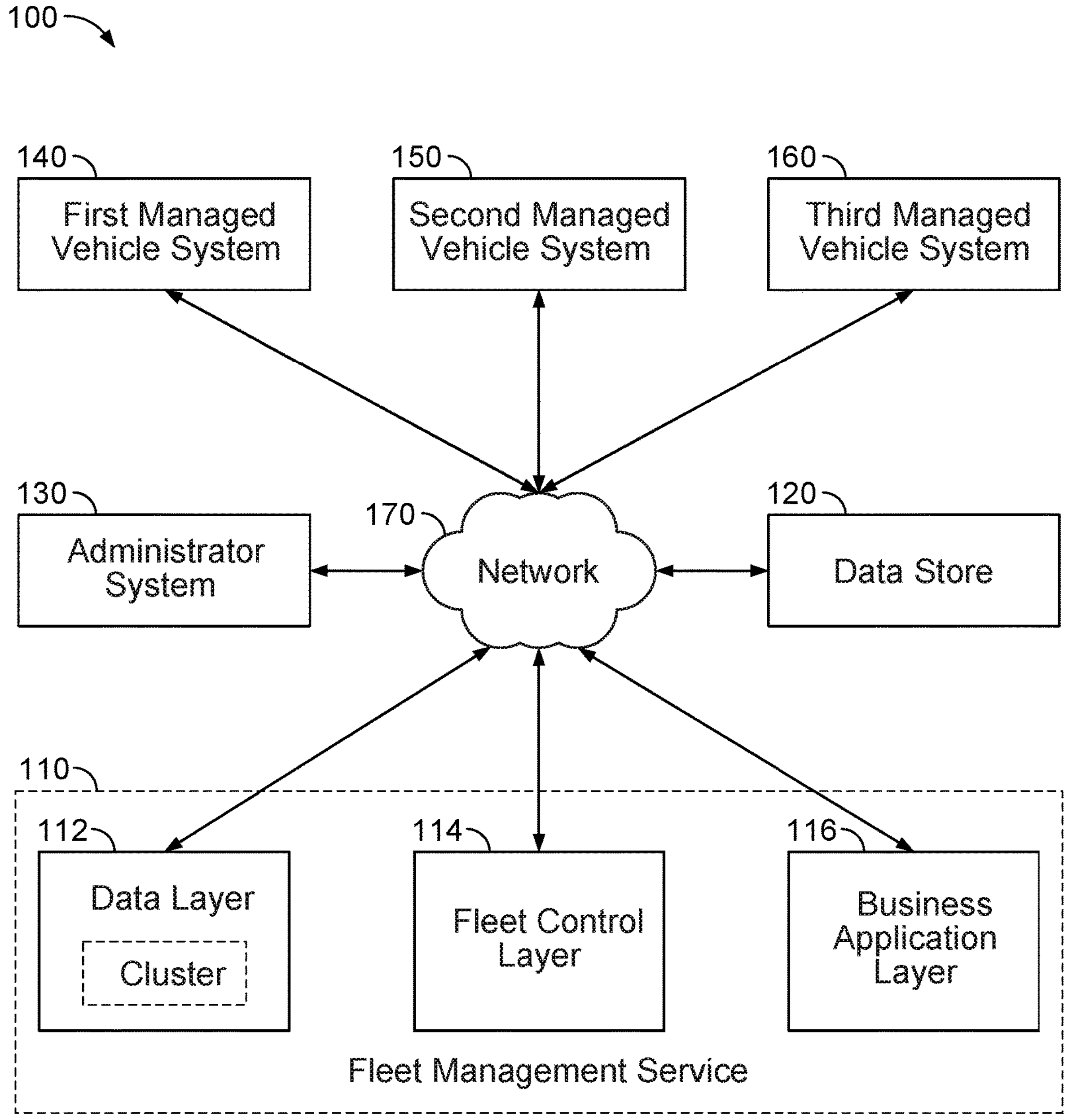
FIG. 1 is a block a diagram of a system for managing a fleet of vehicles according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a managed vehicle may include a vehicle that is in communication with a fleet management service. As an example, the managed vehicle may send to the fleet management service status information, context information, route information, etc. As another example, the managed vehicle may receive from the fleet management service various hazard information, routing information, etc. A managed vehicle may be a vehicle that is registered with fleet management service (e.g., to receive a management service such as re-routing, etc.). A managed vehicle may also be referred to herein as a vehicle.

As used herein, context information (e.g., for a managed vehicle) may include speed, direction of travel, a current route, an image captured by the managed vehicle, a status of the payload, an indication of the payload, a destination, driver information, etc.

Typically, fleet managers use various information to manually make decisions for managing vehicles. For example, in related art systems, fleet managers balance various inputs that may impact the route for a vehicle. Fleet managers use various web browser windows to obtain information that may impact a managed vehicle, such as weather information or traffic information along the planned route for the managed vehicle. This poses a problem because such reliance on obtaining relevant information from separate sources and the manual decision making based on the separate information results in inefficient and error-prone decisions. Further, the reliance on third party sources to provide information relevant to a route(s) for one or more managed vehicles without confirmation that the information is accurate or relevant to decisions for fleet management.

Various embodiments include a method, system, and device for managing a fleet of vehicles (e.g., one or more managed vehicles). The method includes obtaining context information for one or more vehicles; obtaining a plurality of hazard information from one or more data sources; determining whether to perform an active measure for managing a target vehicle of the one or more vehicles based at least in part on the context information, a route of the target vehicle, and/or the plurality of hazard information; and in response to determining to perform the active measure for managing the one or more vehicles, performing the active measure.

Various embodiments include a method, system, and device for generating a unified map corresponding to a particular geographic area associated with one or more managed vehicles. The method includes (i) obtaining context information for one or more vehicles; (ii) obtaining a plurality of hazard information from one or more data sources; (iii) determining, based at least in part on the context information and the plurality of hazard information, whether one or more hazards are comprised in a predefined area; (iv) in response to determining that the one or more hazards are comprised in the predefined area, automatically retrieving one or more detailed location data from a subset of the one or more managed vehicles, where the one or more detailed location data comprise information pertaining to a location of the corresponding one or more hazards; (v) generating a unified map of the predefined area, where the unified map comprises (a) vehicle indicators for the one or more managed vehicles at their respective current locations, and (b) one or more hazard indicators for the one or more hazards, and (vi) providing the unified map to a client via a user interface.

In some embodiments, a unified map includes displaying information related to managed vehicles and hazards in a predefined area. In some embodiments, detailed location data is retrieved associated with the predefined area, hazard(s), and/or managed vehicle(s). In various embodiments, detailed location data comprises one or more of the following: data from a managed vehicle, image(s) from a vehicle event recorder, current speed of a vehicle, weather information from a vehicle (e.g., temperature), windshield wiper status (e.g., switched on, switched off, etc.), vehicle event recorder accelerometer data, global positioning system (GPS) data (e.g., vehicle event recorder GPS or vehicle GPS data), weather data related to the location from a vehicle, traffic information related to the location from a vehicle, event data related to the location from a vehicle, or any other appropriate detailed data related to a location.

In various embodiments, the unified map comprises one or more of the following: a virtual camera layer (e.g., enabling showing images from a vehicle), a traffic layer, a weather warning layer (e.g., enabling showing warnings over specific geographic areas like floods, tornadoes, hurricanes, blizzards, fog, etc.), a current temperature layer (e.g., enabling showing a colored map layer showing temperature across a map area such as the country, county, state, etc.), a minimum temperature layer (e.g., enabling showing areas where it will freeze today), a maximum temperature layer (e.g., enabling showing where over-heating and heat related problems will be issues), a precipitation layer (e.g., enabling showing where and how much it will rain), a snow/sleet layer (e.g., enabling a combination of showing where it will precipitate and where the temperature will be low), a route risk layer (e.g., enabling showing where event or crash hotspots are most likely to occur and under what circumstances), an active vehicle layer (e.g., enabling showing location, speed, heading for all of a customer's vehicles that are moving or have moved in the last 24 hours), or any other appropriate layer. In some embodiments, the active layer can be used to see which vehicles are currently in weather warning areas, are entering precipitation areas, are entering snow/sleet areas, are entering precipitation areas and cold condition areas, are in heavy traffic, are approaching route risk locations, etc.

Various embodiments include a method, system, and device for obtaining one or more current images of a location. The system obtains the one or more current images based on one or more managed vehicles capturing the image(s). For example, the one or more managed vehicles contemporaneously capture the images, such as based on a query from the system (e.g., from a server associated with a fleet management service). As another example, the one or more managed vehicles periodically capture images (e.g., using a fleet recording or image capturing device, such as to capture an image of what is seen from a driver's cab of the vehicle). In some embodiments, the one or more managed vehicles send the captured images (e.g., the current images) to the server upon capturing the image, periodically, or in response to a request from the server. For example, the one or more managed vehicles sends the captured images for the system to store in a database of current images (e.g., a dataset of images captured by a fleet). In some embodiments, the system obtains the one or more current images from the database. As an example, the system deems an image (e.g., an image captured by a managed vehicle) to be a current image if the image was captured within a predetermined time period (e.g., after a predetermined start time of a specific time period and before a predetermined end time of the specific time period). The system automatically retrieves and uses the one or more current images in connection with fleet management (e.g., providing a fleet management service) such as displaying the image with a unified map (e.g., as an overlay to the unified map), providing an alert/prompt to a user (e.g., an operator/driver of a managed vehicle), determining whether to perform an active measure (e.g., update/change a route for a vehicle), assessing a location/area in which a managed vehicle is located or expected to travel along its route, assessing the accuracy of a hazard identified based on source data (e.g., weather information, traffic information, dangerous road conditions, road hazards, road characteristics such as high curvatures or speed limits, route risks such as areas in which a rate of collisions is relatively high, etc.), etc.

In some embodiments, the system generates a unified map that combines geographic data, weather data, hazard data, traffic, live tracking of a fleet of managed vehicles, and a virtual camera showing on-road views captured by cameras on the managed vehicles. The system may present the various types of information as layers on the unified map specifically related to and relevant for a manager of a set of managed vehicles. Combining this information to present a unified map enables fleet managers to see if their managed vehicles are approaching current weather hazards, and if so, see on the ground views of road conditions from other vehicles in the area, along with information about road hazards (such as sharp turns or hills) that the vehicle may encounter. This combined information on one unified map that is specific for managed vehicles enables fleet managers to quickly identify trouble areas and reroute or adjust plans to improve the safety of their fleet.

In some embodiments, the system generates a unified map for a geographical area pertaining to one or more managed vehicles. The system generates the unified map based at least in part on information obtained from various sources, including a set of managed vehicles and/or third-party services such as a weather service, a traffic service, a road hazard service, etc. The system generates the unified map based on generating informational layers for various types of information and overlays the informational layers on the map. The system configures a user interface to display the unified map and provides the user interface to a client system (e.g., to a computer system used by the fleet manager or to a system on a managed vehicle). In some embodiments, the unified map is interactive such that various informational layers can be toggled on/off, elements provided on the unified map are selectable in order to obtain more detailed information, or certain specific and/or relevant elements are enabled to be more emphatically displayed relative to other information. As an example, the unified map includes an element corresponding to an indicator of a managed vehicle. The indicator of the managed vehicle is provided on the geographical area at a current location (e.g., a last reported location). In some embodiments, the indicator is selectable and, upon selection, the route for the corresponding managed vehicle is displayed or displayed more emphatically than other information presented on the map (e.g., such as indicators for other managed vehicle). As another example, the unified map includes an element corresponding to an image of a particular location, such as a current image captured by a managed vehicle. The element corresponding to the image is displayed at a location at which the image was captured by the managed vehicle. In some embodiments, the element corresponding to the image is selectable and, upon selection, the image is displayed or a preview of the image is displayed (e.g., as an overlay to the unified map). In some embodiments, metadata information related to the image (e.g., the time and/or data) are displayed. Selection and display of the image in the context of the unified map allows users (e.g., fleet managers, drivers of managed vehicles) to quickly assess the road conditions at the corresponding location. As another example, the unified map includes an element corresponding to an indicator of a road hazard, such as an accident along a road, etc. The element corresponding to the road hazard is displayed at a location of the road hazard. In some embodiments, the indicator corresponding to the road hazard is selectable and, upon selection, detailed information pertaining to the road hazard is provided (e.g., further detail such as expected delay caused by road hazard, whether the road is impassible, a time the road hazard was reported, an expected time the road hazard will be cleared, etc.) and/or an image of the road hazard is provided.

In some embodiments, the system generates a unified map based at least in part on information obtained from one or more data sources, such as third-party service providers. Examples of the information obtained used in connection with generating the unified map include weather information (e.g., temperature, precipitation, wind, fog, etc.), traffic information (e.g., closed roads, delays, accidents, congestion, etc.), etc. The system may use weather, precipitation, traffic, driving conditions, managed vehicle context information (e.g., location, speed, payload, driver, etc.), etc. to create one or more layers to be presented on the unified map, such as layers including various indicators or alerts within the geographic area or along a route for a managed vehicle. The system uses the information to determine different situations within a geographical area that can impact driving conditions or transport of goods. As an example, the system uses a set of predefined heuristics to determine unsafe driving conditions, or non-ideal driving conditions (e.g., congested traffic) within the geographical area. Unsafe driving conditions can include black ice, traction events, visibility events, high winds (e.g., higher than a predefined wind threshold), etc. An example of a heuristic to determine an unsafe driving condition may include a determination that black ice may be present on a road based on a temperature being below a predefined temperature threshold (e.g., 0° C.) and the presence of precipitation (e.g., precipitation levels greater than a predefined precipitation threshold). The presence of precipitation may be determined based on past precipitation within a threshold period of time (e.g., precipitation levels over the last 24 hours, 12 hours, etc.) and/or based on expected precipitation levels within a threshold period of time (e.g., precipitation expected over the next hour, 2 hours, etc.). In some embodiments, the weather information from a third party source is confirmed or supplemented by image analysis of vehicle images from a geographic area.

In some embodiments, the system uses a set of rules (e.g., circumstances, heuristics, etc.) that have implications for driving conditions. As an example, a set of rules is defined manually by an administrator. As another example, the system determines the set of rules empirically, such as based on performing a machine learning process to build a model to predict driving conditions (e.g., based on historical data). The system applies the set of rules that have implications (e.g., direct implications) on driving conditions, determines an overall outcome for the driving condition based on a set of implications, and determines alerts or active measures to be provided in response to the determination of the overall outcome. As an example, the system highlights a map area (e.g., a geographical area) that has a driving condition, such as by configuring a layer for the unified map. As another example, the system communicates an alert to warn a driver of a current driving condition (e.g., a negative driving condition). The system alerts the driver of the current driving condition when the driver is within the geographical area that the system determines is experiencing the driving condition or when the driver is expected to approach the geographical area within a predefined period of time (e.g., if the system determines that the driver is expected to reach the geographical area impacted by the driving condition within a predefined time threshold, such as within the next 30 minutes, 60 minutes, 120 minutes, etc.).

In some embodiments, the system uses a set of rules to characterize/classify identified driving conditions. For example, the system stores a mapping of specific driving conditions to classes/types/levels of driving conditions. The mapping of specific driving conditions can be used to classify a driving condition as a high-level negative driving condition, a medium-level negative driving condition, and/or a low-level of negative driving condition. Various other classifications may be implemented. Examples of a high-level negative driving condition include an intense snowstorm, flooding, and other driving conditions that are dangerous conditions in which to drive a managed vehicle. Examples of medium-level negative driving conditions include low visibility (e.g., fog, precipitation levels that exceed a threshold precipitation), slippery roads, black ice, expected sun in a driver's line of sight (e.g., based on time of day, direction of travel, etc.), congested traffic, road construction, and other driving conditions that negatively impact driving conditions but are not deemed unsafe (e.g., driving conditions that are not deemed to be a high-level negative driving condition). Examples of a low-level negative driving condition may include driving conditions for which the system determines are low-impact driving conditions (e.g., have an impact on safety or travel below a predefined threshold) or driving conditions that the system determines are not indicative of current medium-level/high-level negative driving conditions. In some embodiments, the system deems medium level/high-level negative driving conditions that previously occurred within a threshold period of time may be deemed to be a low-level negative driving condition. For example, if a snowstorm occurred along a route within the 5 hours before a current time, the system deems the driving condition to no longer be a high-level negative driving condition and deems the driving condition to be a low-level negative driving condition. As another example, if a certain area experienced flooding 24 hours ago, the system deems the driving condition to no longer be a high-level negative driving condition and deems the driving condition to be a low-level negative driving condition. As another example, if a certain area was subject to a black-ice driving condition (e.g., an indication of a medium-level negative driving condition) but the current temperature is above a predefined temperature threshold (or that the current temperature is above the predefined temperature threshold for a predefined amount of time), the system deems the black-ice driving condition to no longer be a medium-level negative driving condition and deems the black-ice driving condition to be a low-level negative driving condition.

The system provides alerts/indications of driving conditions on the unified map. In some embodiments, the system configures the alerts/indications based on the specific driving condition and/or based on a classification of the specific driving condition (e.g., a classification of whether the driving condition is a high-level negative driving condition, a medium-level negative driving condition, or a low-level of negative driving condition, where the level of the driving condition is determined based on a scoring or confidence level and thresholds associated with the condition). As an example, the system causes the indicator for a high-level negative driving condition to be displayed in a manner that is more emphatic than an indicator for a medium-level negative driving condition or a low-level negative driving condition. As another example, the system causes the indicator for a medium-level driving condition to be displayed in a manner that is more emphatic than an indicator for a low-level driving condition. The system may configure the alerts/indications of driving conditions to be displayed differently based on different types or based on selection from a user of a layer to be displayed or highlighted on a unified map. For example, if a user selects to see the route for a particular managed vehicle, the route may be highlighted or displayed differently from routes of other managed vehicles within the geographic area of the unified map. As another example, if a user selects to see alerts for road construction within the geographic area or along a route for a managed vehicle, the system configures the alerts/indicators for driving conditions associated with road construction to be displayed differently (e.g., more emphatically) than alerts/indicators for other driving conditions.

In some embodiments, the system configures the unified map to include a plurality of layers associated with a particular driving condition or type of driving condition. Each of the plurality of layers include information pertaining to the driving condition(s), and each of the plurality of layers have a different level of granularity pertaining to the driving condition(s). For example, the unified map includes a map layer corresponding to a high level of granularity, a map layer corresponding to a medium level of granularity, and a map layer corresponding to a low level of granularity. Various other layers (e.g., layers of different granularity) may be implemented. The map layer corresponding to a high level of granularity includes a general description of the driving condition(s) such as an indication that a particular driving condition exists at a particular location within the geographic area of the unified map. The map layer corresponding to a medium level of granularity includes more detailed information pertaining to the driving condition than the information for the high-level of granularity. For example, the medium level of granularity indicates specific driving condition(s) that exist at a location within the geographic area, such as low visibility, slipper roads, sun in your eyes (e.g., based on time and location in which a vehicle is driving), black ice, etc. The map layer corresponding to a low level of granularity includes even further detailed information pertaining to the driving condition than the information for the medium level of granularity. For example, the low level of granularity includes a time at which the driving condition existed/occurred, an indication of information/conditions that the system used to determine the driving condition (e.g., for black ice, the system may indicate that over the last five hours, weather has dropped below 0° C., and the level of precipitation is greater than 3 inches, etc.).

In some embodiments, the system automatically determines whether to perform an active measure with respect to management of one or more managed vehicles. In various embodiments, the system automatically fetches an image, data, etc. from the vehicle, reroutes the vehicle, alerts the driver, or any other appropriate active measure. In some embodiments, the active measure is selected by a user (e.g., a fleet manager). In some embodiments, in order for the system to provide rerouting, routing information is obtained (e.g., from a database, from the vehicle, etc.) and then using the map information a new route is determined and provided to the vehicle. The system determines whether to perform the active measure based on the unified map or at least a subset of information used to generate the unified map (e.g., weather information, traffic information, road hazard information, etc.). In response to determining that an active measure is to be performed, the system causes the active measure to be performed. For example, the system invokes the active measure or causes another system (e.g., a client system on a managed vehicle) to perform the active measure. Examples of the active measure include automatically retrieving a current image from a managed vehicle or a database of images, automatically re-routing a managed vehicle, determining a proposed alternative route(s) for a managed vehicle and providing the alternative route(s) to a user (e.g., a fleet manager, a driver of a managed vehicle, etc.), providing an alert of a hazard to a user, etc. Various other active measures may be performed.

In some embodiments, the system determines current driving conditions within a geographic area based on the determination that the particular driving conditions occurred within a predetermined time threshold, such as 1 hour, 2 hours, etc. The system may use the current driving conditions to generate the unified map (e.g., generates the unified map to include the information for the current driving conditions). For driving conditions that occurred within a period of time before the predetermined time threshold, the system may disregard or optionally provide indications of such driving conditions based on user input. In some embodiments, with respect to driving conditions for which a time period that has elapsed since first occurrence of the event exceeds the predetermined time threshold, the system determines whether the driving condition still persists (e.g., if a snow storm occurred 5 hours ago, the system may determine whether negative driving conditions persisted during the time period since the occurrence of the snow storm occurred).

In some embodiments, the system fetches images from a fleet of managed vehicles. Fetching the images includes (i) causing a managed vehicle to communicate an image and/or (ii) querying a database storing images obtained from a set of managed vehicles. In some embodiments, fetching an image from a managed vehicle includes causing the managed vehicle to communicate an image captured by the managed vehicle in real-time. As an example, the system (e.g., a server) causes the managed vehicle to capture a real-time image (e.g., using a camera mounted to the managed vehicle) and communicates the image to the system. The system may cause a set of managed vehicles within a proximity to a driving condition (e.g., a driving condition identified by the system based on the information obtained by the data sources, such as weather information, traffic information, etc.). For example, the system identifies managed vehicles within a predefined distance threshold of the identified driving condition and causes the managed vehicles to capture and communicate real-time images of the area corresponding to the driving condition. As another example, the system queries the database of images reported by managed vehicles for recent images within proximity of the driving condition (e.g., images captured within a predetermined time threshold). In some embodiments, the system uses the image(s) pertaining to driving condition(s) in connection with generating the unified map, such as by creating a layer to the unified map including the image(s) In some embodiments, the system uses the image(s) pertaining to driving condition(s) in connection with performing an active measure, such as generating an alert for a user (e.g., a fleet manager, a driver, etc.), re-routing a managed vehicle (e.g., to avoid the driving condition), etc.

In some embodiments, the system uses real-time or recent images captured by a managed vehicle to determine negative driving conditions that are hazardous to drivers. The system may identify a negative driving condition based on information such as weather data, traffic data, road closure data, road data (e.g., curvatures, speed limits, etc.), route risks (e.g., information obtained from the department of transportation, such as high collision risk areas), etc., and use the images captured by the managed vehicle(s) to determine actual on-the-ground conditions and determine whether the actual on-the-ground conditions give rise to hazardous driving conditions. For example, in the event of a snowstorm, the system identifies a driving condition that may be hazardous along a route within the snowstorm, and the system may query an image in the geographic area or along the route to assess whether the road(s) have been plowed, etc. In response to determining that the road has been plowed, the system or fleet manager may determine that the snowstorm does not give rise to a negative driving condition (e.g., a hazardous driving condition) and may so indicate that the driving condition is not deemed hazardous or may exclude such driving condition/event from the unified map, etc.

The system improves the computer system by enabling a more efficient user interface for determining, manually or automatically, actions and/or interventions for a managed fleet. The system actively gathers and provides information relevant to managed fleets that enable improved display and efficient information transfer to a user of the system.

FIG. 1 is a block a diagram of a system for managing a fleet of vehicles according to various embodiments of the present application. According to various embodiments, system 100 implements at least part of process 300 of FIG. 3, process 400 of FIG. 4, process 500 of FIG. 5, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, and/or process 1600 of FIG. 16. In some embodiments, system 100 generates a user interface comprising a unified map, such as interface 1700 of FIG. 17, interface 1800 of FIG. 18, and/or interface 1900 of FIG. 19.

In the example illustrated in FIG. 1, system 100 includes fleet management service 110, data store 120, administrator system 130, and systems for one or more managed vehicles such as first managed vehicle system 140, second managed vehicle system 150, and/or third managed vehicle system 160. In some embodiments, fleet management service 110 and/or data store 120 are integrated (e.g., combined into a layer or a single set of server(s)). System 100 further includes one or more networks such as network 170 over which administrator system 130 and/or first managed vehicle system 140, second managed vehicle system 150, and/or third managed vehicle system 160 communicate(s) with fleet management service 110 or data store 120. In various embodiments, network 170 includes one or more of a wired network, and/or a wireless network such as a cellular network, a wireless local area network (WLAN), or any other appropriate network. System 100 may include various other systems or devices. In some embodiments, system 100 further includes one or more data sources such as third-party data sources (e.g., traffic information, weather information) or information provided by governments (e.g., road information such as collision rates, speed limits, etc.). Fleet management service 110 obtains information form the one or more data sources in connection with generating a unified map and/or determining and implementing an active measure. For example, fleet management service 110 may poll/query the data source(s) for current information or the data source(s) pushes the information to fleet management service or data store 120 (which in turn may be queried by fleet management service 110).

In some embodiments, fleet management service 110 comprises data layer 112, fleet control layer 114, and business application layer 116. Data layer 112, fleet control layer 114, and/or business application layer 116 can be respectively implemented by one or more servers. In some implementations, data layer 112, fleet control layer 114, and/or business application layer 116 can be implemented by a same set of one or more servers. In some embodiments, system 100 comprises a plurality of data layers that respectively process data pertaining to various tenants or customers. For example, each data layer can be instantiated and implemented for a different tenant or customer. Fleet management service 110 may implement different instances for different fleets of managed vehicles, etc.

In some embodiments, system 100 uses fleet control layer 114 to perform various functions pertaining to control/management of a set of managed vehicles (e.g., a fleet). Examples of functions implemented by fleet control layer 114 include unified map generation, vehicle routing (e.g., updating/changing routes based on detected driving conditions), active measure determining and/or implementing, etc.

According to various embodiments, fleet management service 110 performs management of a fleet of vehicles (e.g., a set of managed vehicles) or otherwise provides functionality or information for a fleet manager (e.g., a user associated with the set of managed vehicles) to use in connection with managing the fleet of vehicles. Fleet management service 110 can receive requests to update data for one or more routes or maps associated with a geographical area from administrator system 130 (e.g., used by a fleet manager) and/or systems for one or more managed vehicles such as first managed vehicle system 140, second managed vehicle system 150, and/or third managed vehicle system 160. For example, fleet management service 110 can receive a request to provide a route for a managed vehicle, update a current route for a managed vehicle, provide driving condition data for a managed vehicle (e.g., identify driving condition(s) along the route or within a geographic area associated with the managed vehicle), implement an active measure, provide a unified map, configure a unified map, etc.

In some embodiments, system 100 uses fleet management service 110 to generate a unified map. The unified map is generated using source data, such as map and road data, weather data, traffic data, road closure data, road construction data, parking data, etc. The source data may be stored in data store 120 among one or more datasets or may be received via third party data sources/services such as in the form of a data stream (e.g., a weather service, a traffic service, etc.). In some embodiments, fleet management service 110 queries the one or more third party data sources/services for the source data in connection with generating/updating a unified map (e.g., in response to determining that a unified map is to be generated or updated). In some embodiments, fleet management service 110 periodically queries, or receives from, the one or more third party data sources/services for the source data. As an example, administrator system 130, first managed vehicle system 140, second managed vehicle system 150, and/or third managed vehicle system 160, and/or a third-party data source/services are connected to fleet management service 110 via a connector, such as an application programming interface (API). In some embodiments, fleet management service 110 provides a unified map, information pertaining to the unified map (e.g., a set of indicators comprised in the unified map), information pertaining to an active measure (e.g., a list of potential/recommended active measures) or an instruction to implement an active measure (e.g., an update to a managed vehicle route), such as in response to data requests. For example, the data requests can be communicated to fleet management service 110 by a client system (e.g., managed vehicle system 140). In some embodiments, fleet management service 110 receives a data request from administrator system 130 in connection with a fleet manager using fleet management service 110 to manage a fleet, to monitor a status of the fleet, etc.

In response to receiving a request for a unified map (e.g., a newly generated unified map, an update to a unified map, etc.), fleet management service 110 obtains the applicable source data from data store 120, a managed vehicle (e.g., first managed vehicle system 140, second managed vehicle system 150, and/or third managed vehicle system 160), and/or a third party service(s)/system(s) and generates/update the unified map. As an example, the request for the unified map may include, or be associated with, a particular geographic area. As another example, the geographic area is determined based on the one or more managed vehicles for which the unified map is to be generated/updated or that are to be managed. Fleet management service 110 uses the geographic area to obtain the applicable/relevant source data. For example, fleet management service 110 obtains weather data for the geographic area, traffic data for roads within the geographic area or roads corresponding to a predefined route for a managed vehicle(s), etc. Fleet management service 110 analyzes the source data to determine one or more driving conditions within the geographic area, such as driving conditions that are abnormal or hazardous, and generates the unified map based on the driving conditions. In response to identifying driving conditions (e.g., certain predefined driving conditions or driving conditions that are mapped to being hazardous or of importance), fleet management service 110 generates one or more layers for the unified map. For example, fleet management service 110 annotates a standard geographic/road map with information pertaining to one or more of the identified driving conditions. The annotating the standard geographic/road map includes generating indicators for the driving conditions and configuring one or more layers to include the indicators for the driving conditions. The one or more layers for the unified map may be toggled on/off and when toggled on (e.g., to be displayed), the one or more layers are provided as an overlay to the standard geographic/road map. In some embodiments, the standard geographic/road map is predefined (e.g., stored in data store 120) or a service provider for the geographic standard geographic/road map is predefined. In some embodiments, displays are tailored toward management of fleets and factors relevant to and important for the management of fleets (e.g., threats to fleet, factors for routes of fleet vehicles, etc.).

Fleet management service 110 uses data layer 112 to obtain the source data to be used in connection with generating/updating a unified map or implementing an active measure. In response to fleet management service 110 determining to generate/update the unified map (e.g., in response to receiving a request from a fleet manager via fleet control layer 114), fleet management service instructs/causes data layer 112 to obtain the applicable source data. Data layer 112 can obtain the applicable source data by querying data store 120, a third-party service/data source, and/or a managed vehicle (e.g., first managed vehicle system 140, second managed vehicle system 150, and/or third managed vehicle system 160). Fleet management service 110 also uses data layer 112 to generate the unified map, such as based on parameters provided by fleet control layer 114 (e.g., parameters that are predefined for a fleet or user or that are received from a fleet manager such as via administrator system 130).

Fleet management service 110 uses fleet control layer 114 to obtain/communicate information, instructions, or requests from/to a fleet manager or managed vehicle, such as via administrator system 130 or first managed vehicle system 140, second managed vehicle system 150, and/or third managed vehicle system 160. For example, fleet control layer 114 configures a user interface based on the unified map generated/updated by data layer 112, and fleet control layer 114 provides the user interface to the fleet manager or a managed vehicle. Fleet control layer 114 can receive from a user a request for a unified map or information pertaining to a fleet. In response to receiving the request for the unified map, fleet control layer 114 causes the unified map to be generated/updated. In response to obtaining the unified map, fleet control layer 114 configures the user interface based on the unified map, such as to include the unified map (or a part thereof) or information obtained from the unified map (e.g., indicators of driving conditions, route information, etc.). Fleet control layer 114 then provides the user interface (e.g., the unified map or information pertaining to the unified map) to a user. The user can interact with the user interface, such as to toggle information/layers of the unified map on/off, to select selectable elements provided on the user interface, etc. As an example, the user uses the user interface to select an active measure (e.g., from among a set of recommended active measures), to accept an active measure (e.g., to confirm a recommended routing update), to toggle the granularity of information pertaining to a driving condition that is provided on the user interface, etc.

In some embodiments, fleet management service 110 uses fleet control layer 114 to respond to queries for data with respect to a particular managed vehicle or in connection with controlling the processing of various data requests such as generating a unified map, recommending active measures, etc. As an example, administrator system 130, first managed vehicle system 140, second managed vehicle system 150, and/or third managed vehicle system 160 uses an API to connect to fleet management service 110 and configure one or more settings for obtaining vehicle information (e.g., vehicle status, route, driver, corresponding geographic area, unified map, etc.). Fleet control layer 114 receives the configurations, queries, etc. from the API, queries data store 120 for data responsive to the query or requests data layer 112 to perform a fleet management control (e.g., generate/update a unified map, generate recommended active measures, determine updated routing, retrieving current images of driving conditions, etc.), and provides the data to the system or service requesting the data.

According to various embodiments, system 100 comprises data store 120. System 100 uses data store 120 to store one or more datasets comprising data pertaining to a fleet of managed vehicles (e.g., location information, route information, vehicle information, map information, current images, etc.). Data store 120 can store datasets for a plurality of tenants or customers serviced by fleet management service 110. In some embodiments, fleet management service 110 uses datasets across tenants or customers. For example, fleet management service 110 queries/retrieves current images from managed vehicles across a plurality of tenants/customers to obtain a current image with respect to a particular location or driving condition. In response to detecting a driving condition, fleet management service 110 may determine that a first managed vehicle of a first fleet (e.g., a first customer) is expected to be impacted by the driving condition (e.g., the current route of the managed vehicle is impacted by the driving condition), and fleet management service may query current images pertaining to a location (e.g., within a predefined distance) of the driving location that are captured by the managed vehicles of the first fleet. In response to determining that the current images captured by the managed vehicles of the first fleet do not include the location of the driving condition (e.g., within a predefined time threshold), fleet management service 110 may determine that a second managed vehicle of a second fleet is within the location for the driving condition, and fleet management service 110 requests the second managed vehicle to capture a current image and send the current image to fleet management service 110. In some embodiments, for a virtual camera, a map is divided into a grid of squares or cells. In response to a vehicle providing a location update (e.g., a providing of GPS coordinates to a server), a determination is made as to whether the vehicle is in a cell or a grid square that is in need of an associated data point or an associated image (e.g., if there is no existing data point or image associated with the cell or grid square, if the existing data point comes from a vehicle pointed in a different direction, or if the data point or image is not current, then a new data point or a new image is acquired). In some embodiments, when a data point or image is acquired, the data point is stored or written it can be ranked according to factors such as what road type it is on (e.g., highway, city, ramp, private), how much average daily traffic flows through the road segment, current traffic, and/or weather conditions, current speed of the vehicle, whether the location is an intersection, etc. In some embodiments, the data point and/or an image is stored with metadata (e.g., a location, a latitude, a longitude, a vehicle identifier, a time stamp, a date stamp, a ranking, etc.). In some embodiments, data points or images are considered current for up to a first time period (e.g., 10 minutes, 30 minutes, etc.). In some embodiments, data points or images are retained or considered valid for a second time period (e.g., 24 hours, 1 week, etc.). In some embodiments, on rendering a virtual camera layer of the map, the map is divided into grid squares where the size of the grid squares is based on the zoom level of the map, and only the highest ranked points in each grid square are shown on the map. This biases the display of the map towards large popular roads with bad traffic and weather issues. For a subset of these points images will automatically be fetched. In some embodiments, a user is able to drill into the map to select a manual loading of an image from a vehicle associated with a point on the map in a cell of a grid of the map. Fleet management service 110 then uses the current image in connection with assessing the driving condition, determining an active measure, and/or generating/updating the unified map for the first managed vehicle or first fleet. In various embodiments, the system gathers all relevant information in an area, information from a predetermined number of sources, a predetermined number of pieces of information, or any other appropriate amount of information.

According to various embodiments, system 100 comprises administrator system 130 for use by an administrator such as an administrator of fleet management service 110 or an administrator or a user associated with data store 120 and/or an instance of fleet management service 110, such as a fleet manager. For example, administrator system 130 comprises a system for communication, data access, computation, etc. A user uses administrator system 130 to maintain a dataset stored in data store 120, to define and manage applications provided by system 100, to set data management policies, to set routing policies, to set active measure policies, to set current image policies (e.g., retention policies, permissions, etc.), to provide various system configurations or settings, etc. For example, a user uses administrator system 130 to define one or more security policies that are to be enforced (e.g., by fleet management service 110, data layer 112, and/or fleet control layer 114) with respect to a data stored at data store 120. In some embodiments, administrator system 130 communicates with fleet management service 110 via a web-interface (e.g., by using a web browser, etc.). For example, administrator system 130 communicates with fleet management service 110 via a web-browser installed on administrator system 130 (e.g., via a user interface configured by an application running on fleet management service 110). In some embodiments, administrator system 130 communicates with fleet management service 110 via an application or service running on administrator system 130 (e.g., a connector or API corresponding to fleet management service 110).

In some embodiments, fleet management service 110 comprises business application layer 116. Fleet management service 110 uses business application layer 116 to provide an interface via which a user (e.g., using administrator system 130, etc.) may interact with various applications such as a development application for developing a feature or model for analyzing the data stored in data store 120 (e.g., a feature/model for detecting driving conditions, a feature/model for classifying driving conditions, a feature/model for generating a unified map, a feature/model for determining active measures, a feature/model for routing vehicles, etc.), an application for querying a dataset stored in data store 120, an application for analyzing/manipulating a data entity (e.g., an image, map data, vehicle data, the dataset, etc.), an application to access files stored in a dataset (e.g., a dataset stored in data store 120), etc. Various other applications can be provided by business application layer 116. For example, a user queries data layer 112 by sending a query/request to business application layer 116, which interfaces with data layer 112 to obtain information responsive to the query (e.g., business application layer 116 formats the query according to the applicable syntax and send the formatted query to data layer 112). Business application layer 116 may query fleet control layer 114, which in turn queries data layer 112. As another example, a user uses an interface provided/configured by business application layer 116 to configure (e.g., define) one or more security policies, including configuring access permissions to files, data entities, and/or one or more data management policies.

According to various embodiments, system 100 comprises one or more managed vehicles. The managed vehicles communicate with system (e.g., fleet management service 110) via a managed vehicle system (e.g., first managed vehicle system 140, second managed vehicle system 150, and/or third managed vehicle system 160). The managed vehicles may correspond to a single fleet (e.g., a single tenant/customer), or may correspond to a plurality of fleets. The managed vehicle system is used by a user such as a driver of a managed vehicle to communicate with fleet management service 110 (e.g., a business application layer 116.) and/or data stored in data store 120. For example, the managed vehicle system obtains from fleet management service 110 route information, a unified map, alerts of driving conditions, traffic information, weather information, etc. As an example, the managed vehicle system communicates with fleet management service 110 via a web interface. In some embodiments, the managed vehicle system communicates with fleet management service 110 via an application or service running on a managed vehicle system (e.g., a module such as a connector or API that interfaces with fleet management service 110).

Figure 2:
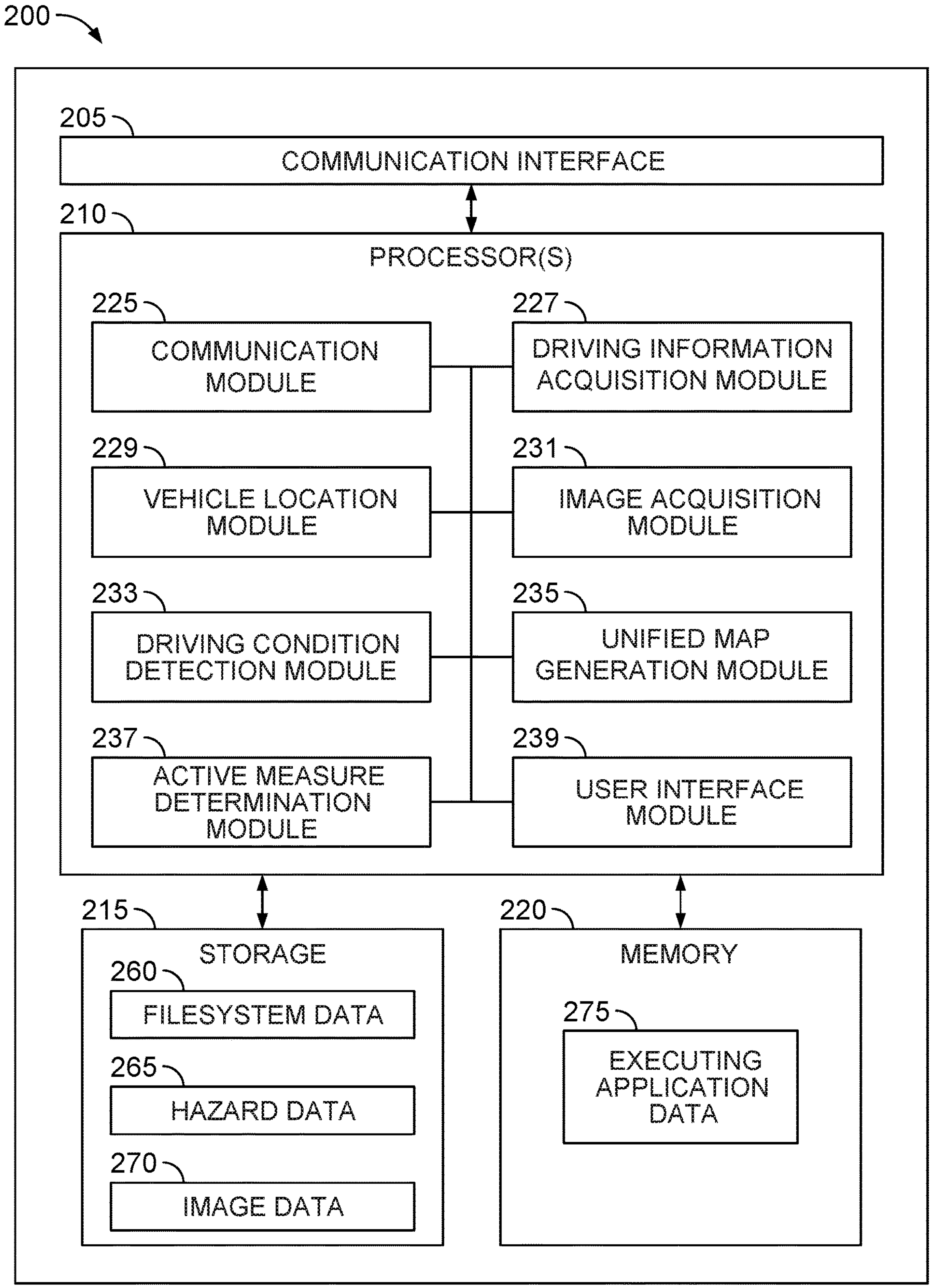
FIG. 2 is a block diagram of a fleet management service for managing managed vehicles according to various embodiments of the present application.

FIG. 2 is a block diagram of a fleet management service for managing managed vehicles according to various embodiments of the present application. According to various embodiments, system 200 implements at least part of fleet management service 110 of FIG. 1. In some embodiments, system 200 implements at least part of process 300 of FIG. 3, process 400 of FIG. 4, process 500 of FIG. 5, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, and/or process 1600 of FIG. 16. In some embodiments, system 200 generates a user interface comprising a unified map, such as interface 1700 of FIG. 17, interface 1800 of FIG. 18, and/or interface 1900 of FIG. 19.

In the example shown, system 200 implements one or more modules in connection with generating/updating a unified map, managing a fleet of managed vehicles, determining a route for a managed vehicle, detecting driving conditions, classifying driving conditions, recommending or implementing an active measure for a managed vehicle, etc. System 200 comprises communication interface 205, one or more processors 210, storage 215, and/or memory 220. One or more processors 210 comprises, or implements, one or more of communication module 225, driving information acquisition module 227, vehicle location module 229, image acquisition module 231, driving condition detection module 233, unified map generation module 235, active measure determination module 237, and/or user interface module 239.

In some embodiments, system 200 comprises communication module 225. System 200 uses communication module 225 to communicate with various other systems such as a user system, an administrator system, a managed vehicle system, a data source (e.g., from which files comprising information to be ingested are received, such as a weather service, a traffic service, etc.), and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data access request, a request for a unified map, a request for driving information (e.g., traffic data, weather data, hazard data, etc.), a request for recommended active measures, a request for routing information (e.g., an updated route based on detected driving conditions), a security policy, an access policy, a fleet management policy, a routing policy, an active measure policy, a driving condition classification policy, a storage system configuration such as a configuration for a partitioning of data, a selection of an active measure, etc. The user input to the user system can include a query for a file (e.g., a csv file, a library, a module, etc.), a query for a data (e.g., a unified map, traffic data, weather data, hazard data, etc.), a request to set one or more security policies (e.g., a permission with respect to accessing a file), etc. Communication module 225 is configured to provide various user systems or data requesting services with information such as a user interface (e.g., an interface corresponding to a managed vehicle dashboard, a unified map, driving condition information), information that is responsive to one or more queries or tasks requested to be executed, credentials for accessing data, etc. In some embodiments, communication module 225 communicates data responsive to data requests (e.g., unified map, routing information, current images, etc.).

In some embodiments, system 200 comprises driving information acquisition module 227. System 200 uses driving information acquisition module 227 to obtain driving information pertaining to fleet(s) of managed vehicles and/or a geographic area (e.g., a geographic area associated with a fleet of managed vehicles), etc. In some embodiments, some of the driving information data is stored by location in a location information service. To retrieve this data the vehicle location is sent to the location information service, and it returns the relevant data. In some embodiments, this data related to location comprises one or more of the following: road name, road type, number of lanes, average daily traffic flow, speed limit, curve/straight, intersection/not intersection, route risk data, weather conditions, traffic conditions, etc. In some embodiments, driving information comprises information obtained by one or more sensors for a managed vehicle(s). Driving information acquisition module 227 communicates with one or more data sources to obtain the driving information. The one or more data sources may be third-party services, such as services with which system 200 is registered, etc. In some embodiments, driving information acquisition module 227 receives streams of information from the one or more data sources. For example, the one or more data services may push information to system 200. In some embodiments, driving information acquisition module 227 queries the one or more data sources, such as in accordance with a predetermined schedule or frequency, in response to requests for unified maps, recommendations for active measures, or routing information, etc. As an example, the predetermined schedule or frequency is set according to a driving information policy set by an administrator/fleet manager, etc.

In some embodiments, driving information includes one or more of hazard data, weather data, traffic data, road construction data, road data (e.g., collision statistics, road safety data, road characteristics such as surface, grade, curvature, number of lanes, speed limits, etc.), etc. Various types of driving information/data are obtained by various service providers. For example, weather data is obtained from a weather service. As another example, road data is obtained from the applicable department of transportation.

In some embodiments, system 200 comprises vehicle location module 229. System 200 uses vehicle location module 229 to manage locations of a set of managed vehicles (e.g., a fleet). Vehicle location module 229 obtains the location data, speed data, and/or heading data for each of the set of managed vehicles. For example, vehicle location module 229 communicates with a managed vehicle and obtains current location data. A managed vehicle may obtain its location data based on an on-board GPS system, etc. In some embodiments, vehicle location module 229 queries the one or more managed vehicles, such as in accordance with a predetermined schedule or frequency. The predetermined schedule or frequency may be set on a vehicle-by-vehicle basis or a fleet-by-fleet basis. For example, the predetermined schedule or frequency is set according to a vehicle location policy set by an administrator/fleet manager, etc. System 200 uses location data for the set of managed vehicles in connection with generating/updating a unified map, detecting relevant driving conditions (e.g., hazardous driving conditions for a managed vehicle), providing recommendations for active measures, and/or determining relevant current images or vehicles to capture current images.

In some embodiments, system 200 comprises image acquisition module 231. System 200 uses image acquisition module 231 to obtain images (e.g., current images) from a data store, such as data store 120 of system 100, or from one or more managed vehicles, such as first managed vehicle system 140, second managed vehicle system 150, or third managed vehicle system 160. Image acquisition module 231 determines parameters for a current image, such as a location, a managed vehicle, a time, etc., and queries the dataset or managed vehicle(s) for a corresponding current image(s). For example, image acquisition module 231 queries the dataset or managed vehicle for an applicable current image, the applicable current image being an image that pertains to a particular driving condition, such as within a predefined distance of a particular driving condition, an image that was captured within a predefined amount of time from a current time, etc. In some embodiments, a vehicle event recorder is queried (e.g., using a vehicle identifier) to fetch an image from a specified time. In some embodiments, an image is already stored for the specified time, and the image is retrieved from the data store instead of fetching the image from the vehicle event recorder.

In some embodiments, image acquisition module 231 pre-fetches current images from the one or more managed vehicle. For example, image acquisition module 231 causes a managed vehicle to capture and send an image before generating/updating the unified map or according to a predetermined schedule/frequency. As another example, image acquisition module 231 stores the pre-fetched images to a dataset, such as in data store 120 of system 100 of FIG. 1. In some embodiments, pre-fetching occurs at the time the data point is recorded if it is ranked high enough. In some embodiments, pre-fetching occurs when the map is rendered. In some embodiments, system 200 pre-fetches one or more images based at least in part on the driving information. For example, system 200 analyzes weather data, and determines to pre-fetch one or more images within areas that system 200 determines are expected to experience a particular driving condition. As another example, system 200 analyzes traffic data, and determines to pre-fetch one or more images within areas that system 200 determines are expected to experience a particular driving condition, such as prefetching an image within proximity of an area in which a collision is reported or for which system 200 determines is expected to comprise a collision.

In some embodiments, system 200 uses a set of predefined factors or composite scoring (e.g., according to a predefined scoring function that factors in one or more of the following: type of road with busier roads being more interesting, average daily traffic flow of a road, proximity to a route risk crash hazard, level of current traffic, a determination of whether there is a reported crash or incident present, current weather conditions, etc.) to determine which images to pre-fetch (e.g., which managed vehicles to query for an image) and make available as an icon on the unified map. As an example, the predefined scoring function is based at least in part on one or more of (i) an extent of a driving condition (e.g., a level of precipitation for a driving condition, a particular temperature range, etc.), (ii) a likelihood of a driving condition (e.g., an expected likelihood that a particular area is experiencing a driving condition), (iii) a number of driving conditions within the area (e.g., a number of driving conditions of the same type of driving conditions), etc.

System 200 uses image acquisition module 231 to obtain a current image in connection with generating/updating a unified map, assessing a detected driving condition, and/or providing an active measure. For example, system 200 creates an image layer for the unified map. The image layer includes one or more image indicators (e.g., selectable elements) associated with current images. The image layer may be configured to provide the one or more image indicators at a location on the map at which the image was captured or a location at which a driving condition occurred (e.g., the image indicator corresponds to a current image within a predefined distance of the detected driving condition). In some embodiments, in response to selection of an image indicator for a current image, the current image is provided on the unified map. For example, the selection of the image indicator for the current image toggles on another image layer that comprises the current image displayed at a corresponding location of the map. As another example, the selection of the image indicator for the current image queries the map to provide the current image in a window on the image layer comprising the image indicators.

In some embodiments, in response to determining that a current image is to be obtained (e.g., the system detects a driving condition within a geographical area), image acquisition module 231 first queries a dataset (e.g., data store 120) for applicable current images. In response to determining that the dataset does not comprise any applicable current images, image acquisition module 231 sends a request to a managed vehicle for a current image (e.g., for the managed vehicle to capture the image in real-time).

In some embodiments, system 200 comprises driving condition detection module 233. System 200 uses driving condition detection module 233 to ingest the driving information and/or current image(s), and to determine driving conditions (if any) within a geographical area, such as a geographical area for which a unified map is generated or a geographical area corresponding to a managed vehicle or fleet of managed vehicles (e.g., a geographic area comprising at least parts of the routes for the fleet). In some embodiments, system 200 uses a predefined set of rules/heuristics or a model for identifying the driving conditions. Driving condition detection module 233 analyzes the driving information and/or current image(s) and queries the set of rules/heuristics or the model for a determination of whether the driving information and/or current image(s) corresponds to a predefined driving condition (e.g., a hazardous driving condition, etc.).

In some embodiments, driving condition detection module 233 uses a model for detecting a driving condition, such as a hazardous condition, based on the driving information and/or current image(s). For example, the model predicts whether a driving condition exists (e.g., currently occurring or occurred within a predefined period of time). The system deems that a driving condition exists if the likelihood of the driving condition existing (e.g., determined based on a model) is greater than a predefined likelihood threshold. The predefined likelihood threshold can be adjusted to adjust the sensitivity of the model. The model for detecting a driving condition may be predefined/pre-trained. For example, the model is pre-trained using a machine learning process. System 200 may train the model or system 200 obtains the model from an administrator system, etc. The model for detecting the driving condition is trained based on historical information, such as historical driving information and negative driving events, such as a car accident, a decrease in the speed in which vehicles travel, etc. The model may be trained based on a relationship between a set of driving information/criteria and negative driving events. In some embodiments, the model is configured to predict occurrence/existence of a driving condition.

In some embodiments, driving condition detection module 233 uses a set of predetermined rules or heuristics to determine that a driving condition occurs/exists. The predetermined rules or heuristics may include a mapping of a set of driving criteria to driving conditions. For example, system 200 stores a mapping of the various sets of driving criteria to the various driving conditions and driving condition detection module 233 queries the mapping based on characteristics of the driving information and/or the current images to determine whether the driving information and/or current images match a predefined driving condition (e.g., a hazardous driving condition, such as slippery roads, impeded vision, excessive traffic or traffic delays, etc.). An example of set of driving criteria mapped to a driving condition (e.g., existence/expectation of black ice) includes a temperature being below a predefined temperature threshold (e.g., 0° C.) and the presence of precipitation (e.g., precipitation levels greater than a predefined precipitation threshold). The presence of precipitation may be determined based on past precipitation within a threshold period of time (e.g., precipitation levels over the last 24 hours, or 12 hours, etc.) and/or based on expected precipitation levels within a threshold period of time (e.g., precipitation expected over the next hour, 2 hours, etc.). Another example of a set of driving criteria mapped to a driving condition (e.g., impaired visibility) includes a time of day being dusk and a direction of travel (e.g., a route for a managed vehicle) being westward. Another example of a set of driving criteria mapped to a driving condition (e.g., impaired visibility) includes a time of day being dawn and a direction of travel (e.g., a route for a managed vehicle) being eastward. Another example of a set of driving criteria mapped to a driving condition (e.g., impaired visibility) includes air temperature being within a predefined threshold of a dew point temperature and/or a windspeed being less than a windspeed threshold, etc. Another example of a set of driving criteria mapped to a driving condition (e.g., impaired visibility) includes a level of precipitation exceeding a precipitation threshold and a road speed limit exceeding a speed threshold. Another example of a set of driving criteria mapped to a driving condition (e.g., impaired visibility) includes a level of precipitation exceeding a precipitation threshold and a road bank exceeding a road bank threshold. Another example of a set of driving criteria mapped to a driving condition (e.g., impaired visibility) includes a rate or number of collisions (e.g., obtained based on historical road safety information, etc.) exceeding a collision threshold. Various other driving conditions may be mapped to a set of driving criteria.

In some embodiments, in response to determining that the current driving information matches a predefined driving condition (e.g., analyzing an image from a vehicle to identify weather such as active snow), driving condition detection module 233 obtains an applicable current image (e.g., a recent image captured within proximity of whether the driving condition is expected to occur) and analyzes the current image to confirm that the driving condition has occurred. For example, driving condition detection module 233 implements image analysis to detect whether a predefined set/number of characteristics associated with a driving condition are comprised in the current image.

In some embodiments, system 200 comprises unified map generation module 235. System 200 uses unified map generation module 235 to generate or update a unified map. In some embodiments, a map is user-driven; the map is updated based on user navigation or active selection of an area. In some embodiments, an email alerts a user to events or hazards in proximity to a fleet vehicle. In some embodiments, the email alert includes one or more of: an image of the map focused on the area with the events or hazards, a link that navigates to the map area, etc. The unified map is generated for at least a particular geographic area, such as a geographic area that is determined/defined based on a set of one or more managed vehicles (e.g., a fleet) and/or routes or destination locations for the one or more managed vehicles. In some embodiments, the geographic area is determined based on user input, such as selection by a fleet manager (e.g., in connection with management of a managed vehicle(s)).

The unified map comprises various different types of data, such as performance data, local data, and third-party data. The unified map presents the various types of data in a format that enables fleet managers or drivers of managed vehicles to have integrated information of the fleet and the context of the fleet (e.g., driving conditions or other potential impacts to the fleet safety, etc.). The unified map enables fleet managers to identify dangerous areas (e.g., based on emphatic display of hazardous areas) and to perform global fleet routing in a manner that avoids the dangerous areas or mitigates the risk associated with the dangerous areas. Further, the association of current images (or ability to retrieve images in real-time from a managed vehicle in a particular area) allows a fleet manager or driver to quickly view and assess the road conditions for a particular road (e.g., to obtain real-time driving conditions). For example, an area of the map may be subject to snowstorm conditions according to weather data, but a current image of the area may show that the driving conditions are not hazardous (e.g., the roads may be plowed, or the snowstorm may not have impacted the particular area). The unified map improves on interfaces implemented by related art systems in which fleet managers use distinct interfaces (e.g., browser windows) for the different types of information. Under related art systems, fleet managers struggle with assembling the entire context of the fleet to make informed decisions on routing and fleet safety. The unified map comprises a plurality of layers that can be toggled on/off to enable the system or fleet managers to make quick assessments of whether a managed vehicle is experiencing, or is expected to experience, a driving condition (e.g., a hazardous driving condition), and whether to perform an active measure.

In some embodiments, the unified map is a universal map that is used for the management of a plurality of managed vehicles, such as a fleet for a customer or a subset of the fleet. For example, system 200 generates the unified map and the unified map is provided to the plurality of managed vehicles. Unified map generation module 235 uses localized information to generate the unified map for the plurality of managed vehicles.

The generation/update of the unified map includes generating/updating a plurality of layers for the unified map. For example, the plurality of layers are provided as overlays to the map (e.g., a geographical map comprising the roads). Examples of the layers comprised in the unified map includes: (i) road data, (ii) managed vehicle data, (iii) managed vehicle routes, (iv) weather data, (v) traffic data, (vi) driving condition data, etc. Various other information may be comprised in a layer for the unified map. The unified map (e.g., the plurality of layers) comprise one or more indicators corresponding to relevant information (e.g., information relevant to the type of information provided on a particular layer).

An example of an indicator for a particular layer includes the layer(s) corresponding to managed vehicle data comprises an indicator(s) for the various managed vehicles. An indicator for a managed vehicle may be provided at point on the map corresponding to a current location of the managed vehicle (e.g., the current location obtained by vehicle location module 229 for the managed vehicle). Accordingly, the indicator(s) for the managed vehicle(s) enable the fleet manager to quickly assess the locations of the managed vehicles within the geographic area.

Another example of an indicator for a particular layer includes the layer(s) for weather data. The indicator may include emphatic display of areas of precipitation (e.g., precipitation that exceeds a predefined precipitation threshold), windy areas (e.g., areas in which windspeed exceeds a predefined windspeed threshold), areas in which a weather event is occurring (e.g., an area subject to a snowstorm may be emphatically displayed).

Another example of an indicator for a particular layer includes the layer(s) for route data. The indicator(s) identify a route for a corresponding managed vehicle. For example, in response to selection of a particular managed vehicle (e.g., a managed vehicle of a fleet for which the unified map is generated), the layer corresponding to the managed vehicle is toggled on and the route for the managed vehicle is displayed emphatically in relation to the map or other layers.

Another example of an indicator for a particular layer includes the layer(s) for traffic data. The indicator(s) for the traffic data layer comprises emphatic displays of high-traffic areas and/or low-traffic areas. For example, the high-traffic area may be displayed in a particular color, such as emphatic display of the road in red. An area is deemed a high-traffic area if a number of vehicles on a road within a particular area exceeds a predefined traffic threshold, or a difference in speed between a speed of vehicles (e.g., an average speed) and a corresponding speed limit or historical average speed for the area. For example, in response to receiving traffic data, system 200 determines the difference between the average speed of vehicles along a particular road and the speed limit or average speed for that road. If system 200 determines that current traffic in the area is less than the speed limit or average speed for that road by a predetermined speed threshold (e.g., 15 mph), then system 200 may deem such area as a high-traffic area. As another example, a low-traffic area may be displayed in a particular color, such as emphatic display of the road in green. A low traffic area may be identified if the average speed of vehicles along a part of a road exceeds the speed limit or historical average speed on the road or the average speed of vehicles is within a threshold speed of the speed limit or historical average speed (e.g., the current average speed is not less than the speed limit or historical average speed by an amount that exceeds a predetermined speed threshold.

Another example of an indicator for a particular layer includes the layer(s) for road data. The indicator(s) for the road data layer(s) comprises an indicator(s) for road construction, indicator(s) of parts of road(s) that are hazardous or negatively impact travel. In some embodiments, system 200 deems parts of a road as hazardous or as a negatively impact to travel includes a high-curvature in the road (e.g., a curvature that exceeds a predetermined threshold curvature), a high road bank (e.g., a road bank that exceeds a predetermined road bank threshold), a significant change in road speed limit (e.g., a change in speed limit that exceeds a predetermined speed difference), an area in which a significant amount of animal crossings are observed in historical data or otherwise identified in the road data (e.g., animal crossing signs on the road), an area in which a historical collision rate (e.g., reported by the applicable department of transportation, etc.) exceeds a predetermined collision threshold, etc.

Another example of an indicator for a particular layer includes the layer(s) for image data. The indicator(s) indicate a part of a road or geographic area for which a current image is available (e.g., stored in a dataset or in which a managed vehicle is located to capture an image). In some embodiments, the indicator corresponding to availability of a current image is a selectable element that is configured to display a corresponding image in response to selection thereof. For example, in response to receiving a user input from a fleet manager to an indicator for a current image, the image is displayed, such as on the same layer as the layer for image data, or a new layer that is overlaid thereon. The current image is retrieved and displayed in a window, such as a window overlaid on the map, or a window displayed in a frame adjacent to the map.

In some embodiments, the unified map includes one or more elements that are generated in connection with recommending or implementing an active measure. For example, the unified map includes a user interface element that is associated with notifying the drivers of the managed vehicles (e.g., the managed vehicles expected to be impacted, or the managed vehicles for which the unified map is generated). Upon selection of the element, system 200 communicates a notification for the applicable driving condition (e.g., an alert/prompt comprising information pertaining to the driving condition). In some embodiments, a layer of the unified map comprises a user interface element that, upon selection, implements an active measure. The user interface element comprised in a layer may correspond to a particular driving condition expected based on information comprised in the layer. System 200 (e.g., active measure determination module 237) may determine a set of recommended active measures, and the unified map (e.g., the corresponding layer of the unified map) is configured to provide an indication of one or more of the set of recommended active measures. System 200 may further configure the unified map to include one or more user interface elements that enable a user to select a recommended active measure to be implemented. Examples of recommended active measures may include: (i) fetch a current image from a managed vehicle in the area, (ii) re-route a managed vehicle(s) expected to be impacted by a driving condition, (iii) send a notification/alert to a driver of the managed vehicle(s) expected to be impacted, etc. Various other active measures may be recommended.

In some embodiments, the unified map is configured to provide a level of granularity of driving information or alert of driving conditions based on an extent to which the unified map is zoomed in.

In some embodiments, the unified map is provided to include further granularity as a user interface is controlled to zoom-in on a particular part of the unified map. For example, in a relatively zoomed-out display of the unified map, the unified map includes high-level information pertaining to driving conditions or managed vehicles. As an example, the high-level information includes an indication of a driving condition deemed to generally impact a first area. As another example, the high-level information includes only particular types of driving conditions (e.g., a set of predefined hazardous conditions or for which an extent or likelihood of a hazard exceeds a predefined hazard threshold). As the unified map is zoomed-in more detailed information is provided. For example, a more granular representation of a weather condition may indicate specific areas of the first area in which the weather condition negatively impacts travel. As another example, the first area may include a single indicator of an available current image when the unified map is in a zoomed-out condition, and when the unified map is in a zoomed-in condition, a more granular representation of available current images in the first area is provided, such as a plurality of user interface elements corresponding to different current images available within the first area (e.g., at their respective locations within the first area). As an example, the high level information may include one indicator for the first area if the density of indicators (e.g., for a same type driving condition) in the first area exceeds a predefined density threshold, and as the unified map is zoomed out, the indicator(s) for the driving condition are provided based on a recomputed density of indicators within parts of the first area.

In some embodiments, when the unified map is in a zoomed-out condition, the unified map is presented as including high-level information such as traffic data (e.g., emphatic display of high-traffic areas), a weather overlay (e.g., a shaded layer corresponding to level of precipitation, temperature, etc.), an indication of managed vehicle location(s), etc. When the unified map is configured to zoom-in, the unified map is presented to include more detailed information such as warnings of high-collisions areas of a road within the zoomed-in area or parts of a road having a high-curvature (e.g., a sharp turn). When the unified map is configured to be even further zoomed-in, the unified map is presented to include detailed information pertaining to a road or other driving information within the zoomed-in area, such as an indication of road speed limits, collisions, road construction, etc. In some embodiments, each layer has its own unique behavior when zoomed out vs zoomed in. For example, the active vehicle layer may show vehicles clustered together with the count of vehicles in each cluster when zoomed out. When zoomed in, the layer breaks the clusters apart, showing the location of each vehicle. In comparison, the route risk crash hazards layer may not cluster at all, instead filtering to show the highest ranked hazards when zoomed out and then showing additional lower ranked hazards when zoomed in. In comparison, the weather layers may not cluster or filter instead showing low detail images when zoomed out and high detail images when zoomed in.

In some embodiments, system 200 comprises active measure determination module 237. System 200 uses active measure determination module 237 to determine, recommend, and/or implement one or more active measures. In some embodiments, active measure determination module 237 determines an active measure to recommend or automatically implement based at least in part on the driving information and/or images captured by one or more managed vehicles within an area. For example, active measure determination module 237 uses an identified driving condition to recommend active measures to eliminate or mitigate the driving condition. Examples of active measures include: (i) re-routing a managed vehicle (e.g., a managed vehicle expected to be impacted by a particular driving condition), (ii) alerting the driver of the managed vehicle, (iii) fetching an image for the particular area, and/or (iv) sending the image to a driver or fleet manager, etc.

In some embodiments, active measure determination module 237 determines routing for one or more managed vehicles. The routing for a managed vehicle is determined based at least in part on a current location of the managed vehicle, a destination location of the managed vehicle, a driving condition (e.g., a hazardous driving condition)

within a geographic area corresponding to the current location and destination location, etc. Various other factors may be used in connection with routing the managed vehicle, such as characteristics of the managed vehicle (e.g., size or weight of the managed vehicle, type of payload), characteristics of the driver of the managed vehicle (e.g., the driver's experience level or history of driving), a severity of the driving condition expected to impact the geographic area, a type of driving condition (e.g., road closure, traffic, snowstorm, etc.). In some embodiments, the routing for the managed vehicle is determined based at least in part on a cost function and/or one or more predefined parameters. For example, the cost function includes variables such as distance, speed, expected time of arrival, likelihood of a driving condition occurring along the route, a severity of a driving condition along the route, an amount of tolls incurred along the route, a traffic congestion, etc. The one or more predefined parameters may correspond to a predefine set of rules that are configured on a fleet, managed vehicle, or driver basis. Examples of rules include avoid toll roads, avoid freeways, minimize distance traveled on city roads, avoid high road bank parts of roads, avoid high curvatures in the road, etc.

In some embodiments, a managed vehicle is automatically re-routed or is re-routed based on use input such as an input from a fleet manager or a request from a driver. The managed vehicle can be automatically re-routed in the event of a predefined driving condition or set of driving conditions.

In some embodiments, system 200 comprises user interface module 239. System 200 uses user interface module 239 to provide a user interface to a user (e.g., via a client system such as for a fleet manager or a driver of a managed vehicle, etc.) via which the user configures, defines, or develops data entities, policies, preferences, cost functions, models (e.g., driving condition prediction models), access permissions with respect to certain data (e.g., the unified map or alerts generated for a managed vehicle), etc., or via which the user interfaces with the unified map (e.g., adjusts the zoom, selects an indicator, requests an image, selects a recommended active measure, etc.).

According to various embodiments, storage 215 comprises one or more of file system data 260, hazard data 265, and/or image data 270. Storage 215 comprises a shared storage (e.g., a network storage system) and/or database data, and/or user activity data.

In some embodiments, file system data 260 comprises a database such as one or more datasets for data entities (e.g., one or more datasets for one or more features, models, schemas, tables, unified maps, configurations for managed vehicles, fleets, drivers, settings, vehicle location data, etc.). File system data 260 can store various policies a routing policy, a notification policy, an active measure policy, etc. File system data 260 may further comprise driving information, such as information obtained by one or more data sources or sensors from a managed vehicle (e.g., weather data, traffic data, etc.).

In some embodiments, hazard data 265 comprises information pertaining to a hazardous driving condition (or other occurrence that negatively impacts driving conditions). Hazard data 265 can comprise an indication of the hazardous driving condition, detailed information pertaining to the hazardous driving condition (e.g., characteristics that gave rise to the driving condition being identified, such as temperature, precipitation levels, traffic, road bank, road curvature, road speed limit, time of day, etc.).

In some embodiments, image data 270 comprises one or more images captured by a managed vehicle. Image data 270 may include images for a particular tenant/customer, or images across various tenants/customer serviced by system 200. Image data also comprises information pertaining to the images, such as time captured, location at which image is captured, etc.

According to various embodiments, memory 220 comprises executing application data 275. Executing application data 275 comprises data obtained or used in connection with executing an application such as an application executing in connection with managing vehicles, an application executing to generate unified maps, an application executing to determine, recommend, or implement active measures, an application that processes and/or responds to queries, an application that generates models for detecting (e.g., predicting) driving conditions, etc. Other applications comprise any other appropriate applications (e.g., an index maintenance application, a communications application, a chat application, a web browser application, an image analysis application, a report preparation application, a user interface application, a data analysis application, an anomaly detection application, a user authentication application, a security policy enforcement application, a code analysis application, a code development application, etc.).

Figure 3:
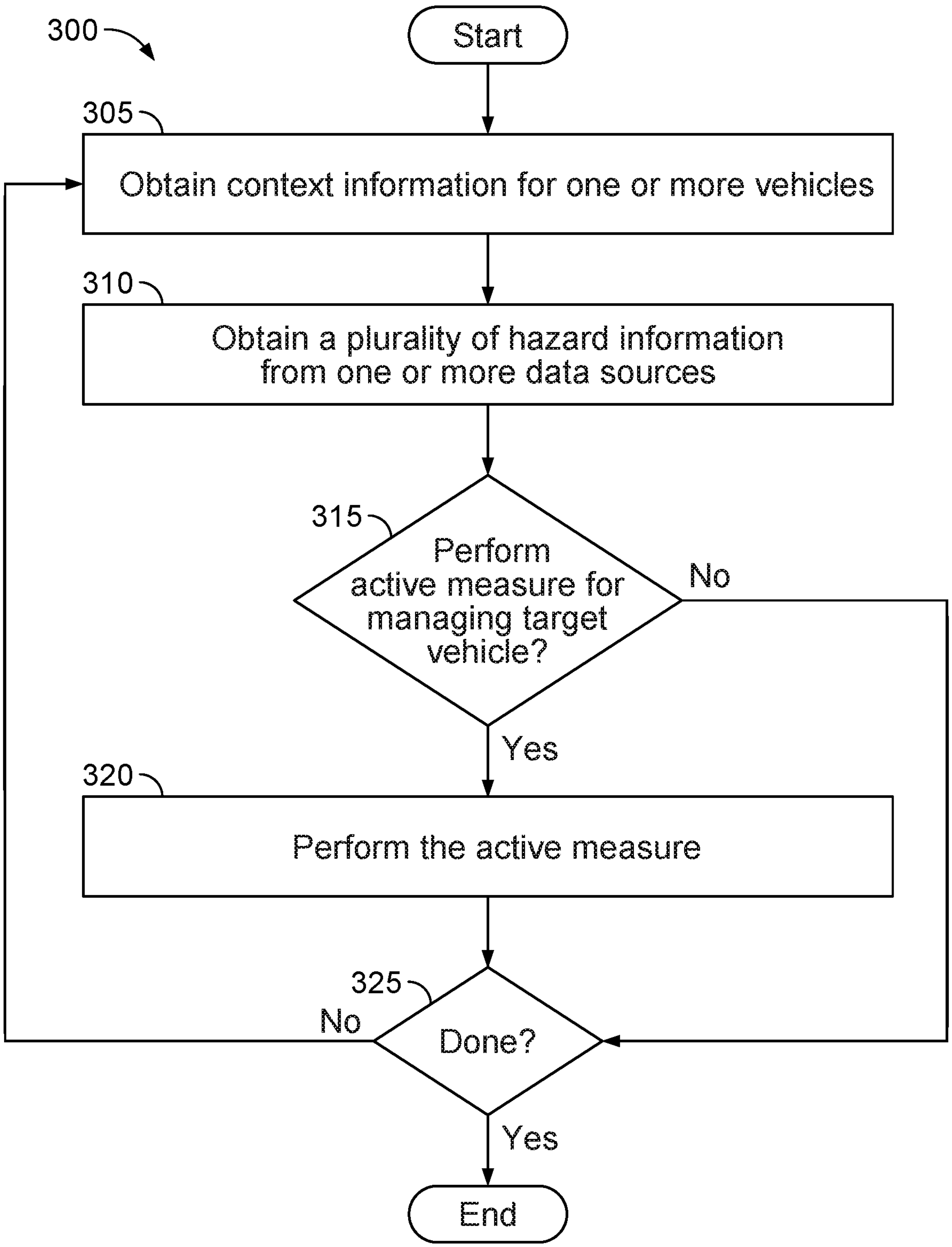
FIG. 3 is a flow diagram of a method for performing an active measure with respect to one or more managed vehicles according to various embodiments of the present application.

FIG. 3 is a flow diagram of a method for performing an active measure with respect to one or more managed vehicles according to various embodiments of the present application. In some embodiments, process 300 is implemented by system 100 of FIG. 1 and/or system 200 of FIG. 2.

At 305, context information for one or more vehicles is obtained. In some embodiments, the context information obtained by the system (e.g., fleet management service 110 of system 100) includes vehicle location, vehicle identifier, driver identifier, payload of the vehicle, destination location of the vehicle, etc. A managed vehicle may push context information, such as according to a predetermined schedule or frequency. Alternatively, or additionally, the managed vehicle communicates the context information in response to a request from the system.

At 310, a plurality of hazard information is obtained from one or more data sources. In some embodiments, the system obtains driving information from one or more data sources, such as third-party service providers (e.g., weather service, traffic service, etc.) and/or sensors on a managed vehicle(s). The system determines hazard information based on the driving information. For example, the system uses a model to predict driving conditions (e.g., hazardous conditions) based on the driving information. As another example, the system uses one or more predefined sets of rules to detect a driving condition (or a likely driving condition) based on the driving information.

At 315, the system determines whether to perform an active measure for managing a target vehicle. In some embodiments, the system determines whether to perform an active measure based at least in part on one or more of the following: the driving information (e.g., the hazard information), a route of the target vehicle, a location of the target vehicle, and the context information for the one or more vehicles. Examples of the active measure include one or more of the following: providing information (e.g., hazard information) to a system user (e.g., a fleet manager, a safety manager, a dispatcher, one or more drivers, one or more nearby drivers to a hazard, etc.) automatically retrieving a current image from a managed vehicle or a database of images (e.g., using a vehicle position, a hazard location, etc.), automatically re-routing a managed vehicle, determining a proposed alternative route(s) for a managed vehicle and providing the alternative route(s) to a user (e.g., a fleet manager, a driver of a managed vehicle, etc.), providing an alert of a hazard to a user (e.g., an audio or a verbal warning, a text warning, an image warning, a graphic warning, a symbol warning, etc.), etc. Various other active measures may be performed. In various embodiments, an active measure comprises providing a user with a user interface control to provide alerts/information (e.g., a button to provide a driver with an alert), providing an administrator with a user interface control to share information (e.g., a button to share hazard information with others in the organization—for example, with a safety manager, a fleet manager, and/or a dispatcher, etc.), or any other appropriate user interface configuration.

In some embodiments, the system determines whether to perform an active measure based on a determination that a driving condition exists (e.g., has occurred or is likely to occur) and one or more active measure rules. For example, the one or more active measure rules may be mapped to various scenarios such as snowstorms, black ice, impaired visibility, collision, traffic congestion, etc. The one or more active measure rules may include parameters that are to be satisfied for each type of scenario in order for a corresponding active measure to be performed.

In some embodiments, the system determines whether to perform the active measure based at least in part on a severity of a detected driving condition (e.g., traffic causing a delay exceeding a delay threshold, precipitation exceeding than a precipitation threshold, road curvature exceeding a curvature threshold, etc.). For example, if a severity of a detected driving condition exceeds a predefined severity threshold, the system determines to perform an active measure. As another example, if the severity of the detected condition exceeds the predefined severity threshold, the system automatically implements the active measure (e.g., automatically determines and implements a re-routing of a managed vehicle having a route that intersects or is otherwise expected to be impacted by the driving condition).

In some embodiments, the system determines whether to perform the active measure based at least in part user input, such as selection of a recommended active measure by a fleet manager, safety manager, or driver. For example, the system generates a set of recommended active measures and provides the recommended active measures to the fleet manager or driver. As an example, the set of recommended active measures are provided in the unified map or in connection with the display of the unified map (e.g., by a user interface at a computer system, such as administrator system 130 or first managed vehicle system 140, etc.). As another example, the system determines whether to perform an active measure by providing information displays to a user and/or receiving user input regarding one or more of the following: performing an active measure for managing a target vehicle, not performing an active measure for managing a target vehicle, selecting one or more active measures, indicating an active measure, providing information to other users as the active measure, or any other appropriate determining manner.

In response to determining to perform the active measure for managing the target vehicles at 315, process 300 proceeds to 320 at which the active measure is performed. Conversely, in response to determining that the active measure is not to be performed at 315, process 300 proceeds to 325.

At 325, a determination is made as to whether process 300 is complete. In some embodiments, process 300 is determined to be complete in response to a determination no vehicles are currently being managed or in communication with the system, a user has exited the system, a user indicates that process 300 is to be paused or stopped, etc. In response to a determination that process 300 is complete, process 300 ends. In response to a determination that process 300 is not complete, process 300 returns to 305.

Figure 4:
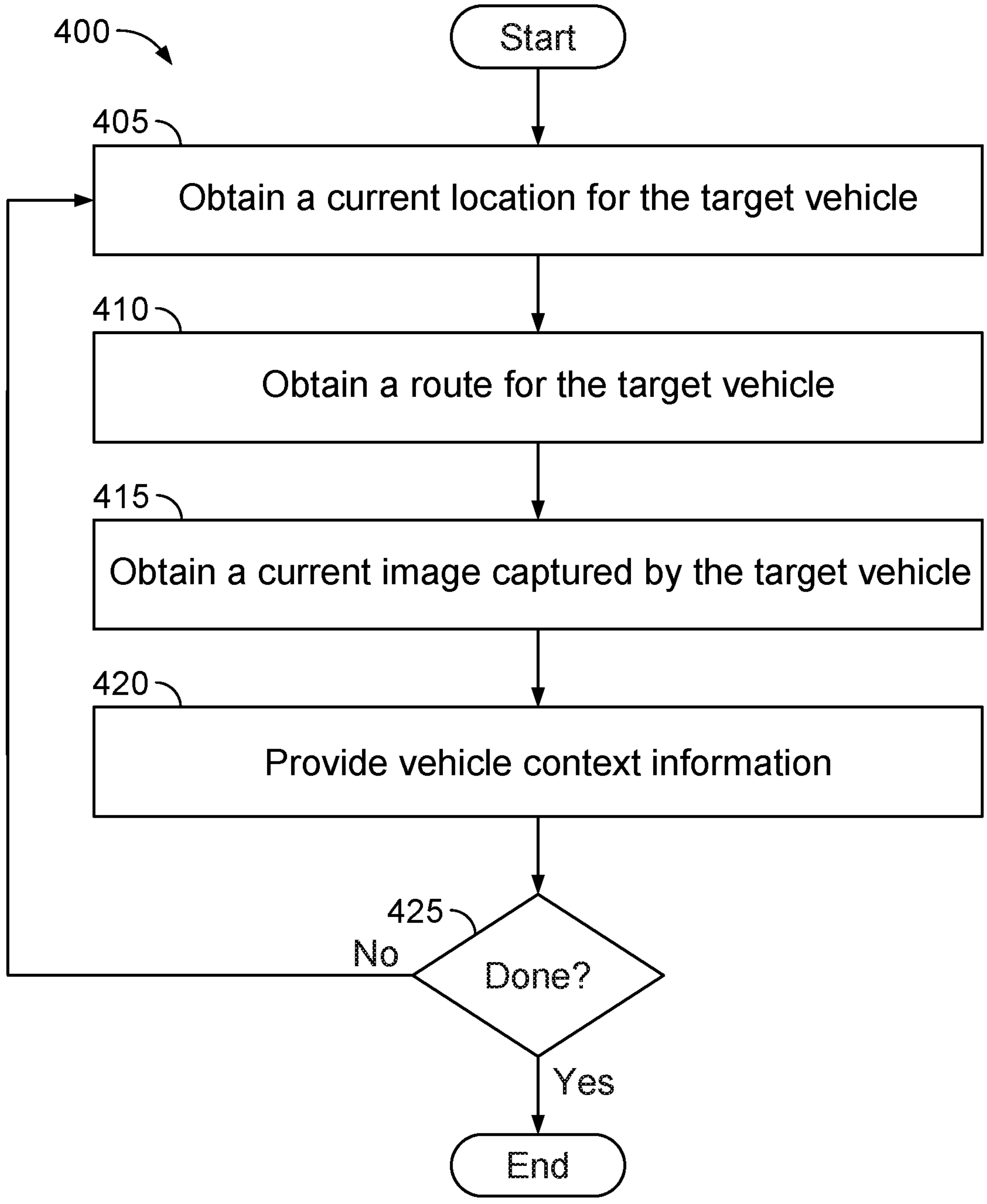
FIG. 4 is a flow diagram of a method for obtaining context information for a managed vehicle according to various embodiments of the present application.

FIG. 4 is a flow diagram of a method for obtaining context information for a managed vehicle according to various embodiments of the present application. In some embodiments, process 400 is implemented by system 100 of FIG. 1 and/or system 200 of FIG. 2. In some embodiments, process 400 is invoked by 305 of process 300 of FIG. 3.

At 405, a current location is obtained for a target vehicle. In some embodiments, the current location for a target vehicle (e.g., a managed vehicle that fleet manager is reviewing) is communicated by the target vehicle. For example, the target vehicle reports its current location at predefined intervals. As another example, the target vehicle communicates its current location in response to receiving a request from the system (e.g., fleet management service 110 of system 100).

At 410, a route for the target vehicle is obtained. The system obtains the current route for the target vehicle, such as based on information communicated by target vehicle, or a route previously determined by the system. For example, the system uses an identifier associated with the target vehicle to perform a lookup of the route for the target vehicle. The system may store a mapping of target vehicles to routes, and the system can query the mapping of target vehicles to routes based at least in part on the identifier of the target vehicle to determine the route for the target vehicle.

At 415, a current image that for the target vehicle is obtained. In some embodiments, the current image is captured by the target vehicle. For example, the system sends a request to the target vehicle to capture an image using a camera(s) mounted to the vehicle.

In some embodiments, the system obtains a current image based at least in part on the current location or route of the target vehicle. For example, the system queries a dataset of images captured by vehicles registered with the system (e.g., managed vehicles for one or more fleets for which the system provides a fleet management service) for a recent image pertaining to a location of the vehicle. The system may deem an image captured within a threshold period of time (e.g., 15 minutes, 30 minutes, 1 hour, 2 hours, 5 hours, 24 hours, etc.) to be a recent image. The system uses the current location and/or route in connection with querying the dataset of images. For example, the system obtains an image captured along a route (e.g., along the route but within a certain proximity or estimated location along the route within a certain period of time).

At 420, vehicle context information is provided. For example, the system returns the vehicle context information to the process that invoked process 400, such as 305 of process 300.

At 425, a determination is made as to whether process 400 is complete. In some embodiments, process 400 is determined to be complete in response to a determination no further context information is to be provided, such as to a fleet management service, the communication between the vehicle and the system (e.g., the fleet management service) is disconnected, the vehicle is offline with respect to the fleet management service, a user has exited the system, a user indicates that process 400 is to be paused or stopped, etc. In response to a determination that process 400 is complete, process 400 ends. In response to a determination that process 400 is not complete, process 400 returns to 405.

Figure 5:
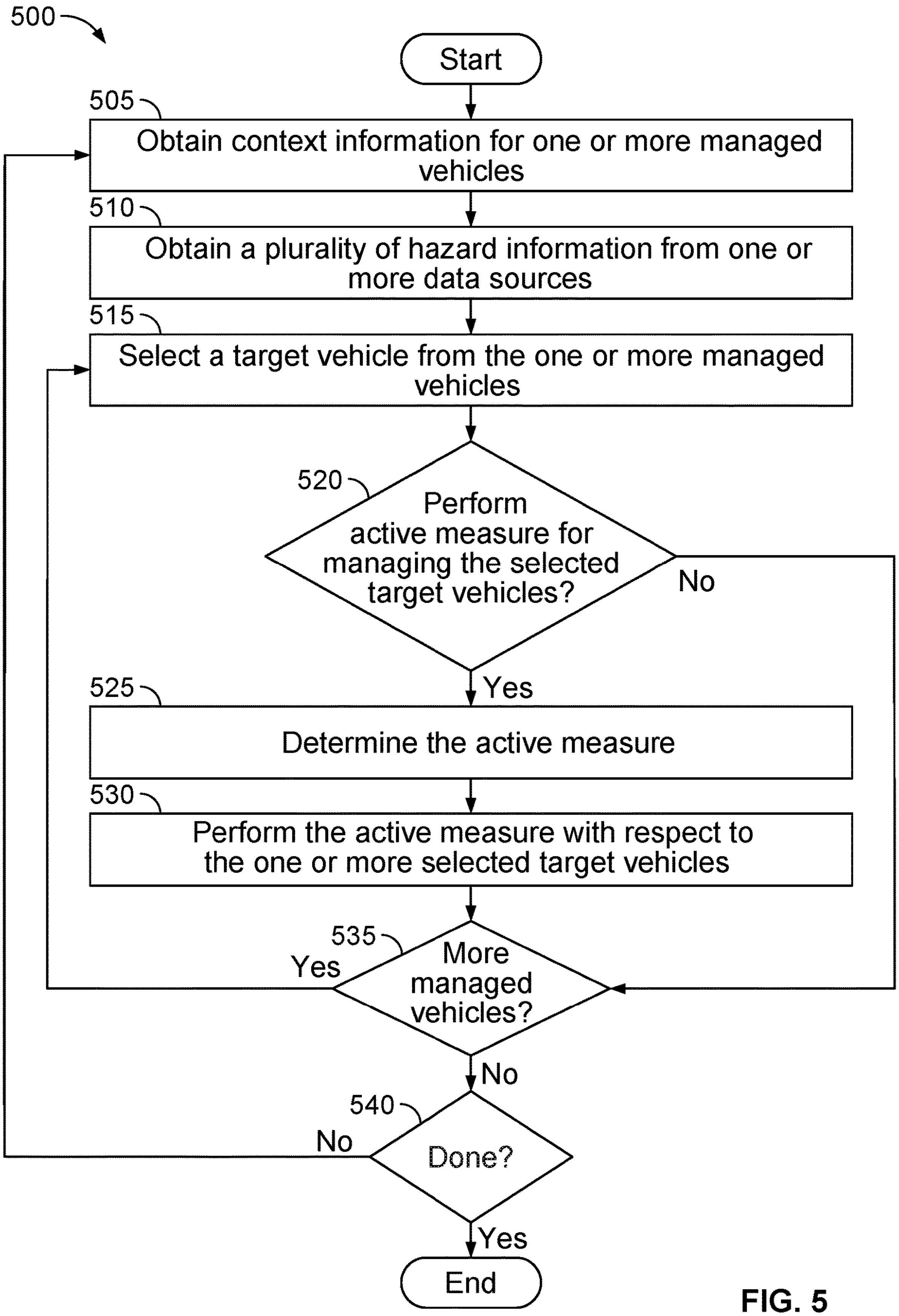
FIG. 5 is a flow diagram of a method for performing an active measure with respect to one or more managed vehicles according to various embodiments of the present application.

FIG. 5 is a flow diagram of a method for performing an active measure with respect to one or more managed vehicles according to various embodiments of the present application. In some embodiments, process 500 is implemented by system 100 of FIG. 1 and/or system 200 of FIG. 2. In some embodiments, process 500 is invoked by 315 of process 300 of FIG. 3.

At 505, context information is obtained for one or more managed vehicles. In some embodiments, 505 corresponds to, or is similar to, 305 of process 300 of FIG. 3.

At 510, a plurality of hazard information is obtained from one or more data sources. In some embodiments, 510 corresponds to, or is similar to, 310 of process 300 of FIG. 3.

At 515, one or more target vehicles are selected from the one or more managed vehicles. In some embodiments, the system receives selection of a target vehicle(s). A fleet manager may select a set of one or more target vehicles for which fleet management is to be performed (e.g., for which assessment of whether to perform an active measure is to be performed). The fleet manager can select the target vehicle(s) based on a predefined set of one or more target vehicles or based on a user input to an indicator provided on a unified map (e.g., the indicator corresponding to a particular managed vehicle within the geographic area of the unified map). In some embodiments, the system selects the target vehicle based on a determination that a request for fleet management services (e.g., recommendations of active measures, implementation of active measures) is received from a particular managed vehicle.

At 520, the system determines whether to perform an active measure with respect to the one or more selected target vehicles. In some embodiments, 520 corresponds to, or is similar to, 315 of process 300 of FIG. 3. In some embodiments, the system determines to perform the active measure based at least in part on a user input, such as by a fleet manager or driver. For example, the user input is a request for an active measure to be performed or recommended (or selection of a selectable element on a user interface corresponding to such request). As another example, the user input corresponds to a request to perform certain functionality, such as to determine new/updated routes for the target vehicle(s), etc.

In some embodiments, the system determines whether to perform the active measure based at least in part on the context information for the target vehicle and hazard information corresponding to the target vehicle. The system may deem hazard information as corresponding to the target vehicle based at least in part on one or more of (i) a hazard being within a proximity threshold (e.g., predetermined distance) of the target vehicle, (ii) a determination that the target vehicle is expected to be impacted by the hazard (e.g., a likelihood that the hazard will impact the route when the target vehicle is travelling at that area), (iii) a time since the hazard has occurred (e.g., a hazard that occurred more than a threshold period of may be deemed stale and not a driving condition giving rise to an active measure), and/or (iv) a severity of the hazard.

In response to determining that the active measure is to be performed with respect to the one or more target vehicles at 520, process 500 proceeds to 525. Conversely, in response to determining that the active measure is not to be performed with respect to the one or more target vehicles, process 500 proceeds to 535.

At 525, the active measure is determined. In some embodiments, the system determines the active measure to be performed based on a user input, context information for the target vehicle, a status of vehicle, a particular hazard or type of hazard that is expected to impact the target vehicle, a severity of the hazard, configuration settings, user preferences, a captured image of the hazard area, user selection such as by the driver or fleet manager, etc. As another example, the system determines the active measure based on a type of active measure selected/requested by a user. If the user selects a button corresponding to a request to re-route the target vehicle, the system determines that the active measure includes re-routing the target vehicle and correspondingly determining an updated route for the target vehicle. The system may further send the updated route to the target vehicle for implementation. If the user selects a button to view an image of the hazard, the system determines that the active measure includes retrieving the image and providing the image on a user interface, such as an overlay to a unified map. If the user selects a button to alert a user (e.g., a driver of the target vehicle), the system determines that the active measure includes generating an alert and sending the alert to the user (e.g., to cause the user interface used by the user to display the alert). In various embodiments, an active measure includes one or more of the following: an instruction to rest, and instruction to stop, an instruction to change routes, an instruction to slow driving speed, an instruction to accelerate driving speed, an instruction to change drivers, an instruction to park a vehicle in a safe location, a warning about weather conditions, a warning about traffic, a warning about a severe accident, an instruction to contact a driver's manager or dispatcher, or any other appropriate active measure.

At 530, the active measure is performed with respect to the one or more selected target vehicles. In response to determining the active measure, the system implements the active measure, or causes the active measure to be implemented.

At 535, the system determines whether one or more managed vehicles exist for which a determination of whether to perform an active measure has been made. In response to determining that the system is to determine whether to perform an active measure with respect to one or more other managed vehicles at 535, process 500 returns to 515, and process 500 iterates over 515-535 until the system has assessed whether to perform, as applicable, an active measure for all of the one or more managed vehicles. Conversely, in response to determining that the system is not to determine whether to perform an active measure with other managed vehicles at 535, process 500 proceeds to 540.

At 540, a determination is made as to whether process 500 is complete. In some embodiments, process 500 is determined to be complete in response to a determination no further active measures are to be performed, no managed vehicles are connected to the fleet management service, a user has exited the system, a user indicates that process 500 is to be paused or stopped, etc. In response to a determination that process 500 is complete, process 500 ends. In response to a determination that process 500 is not complete, process 500 returns to 505.

Figure 6:
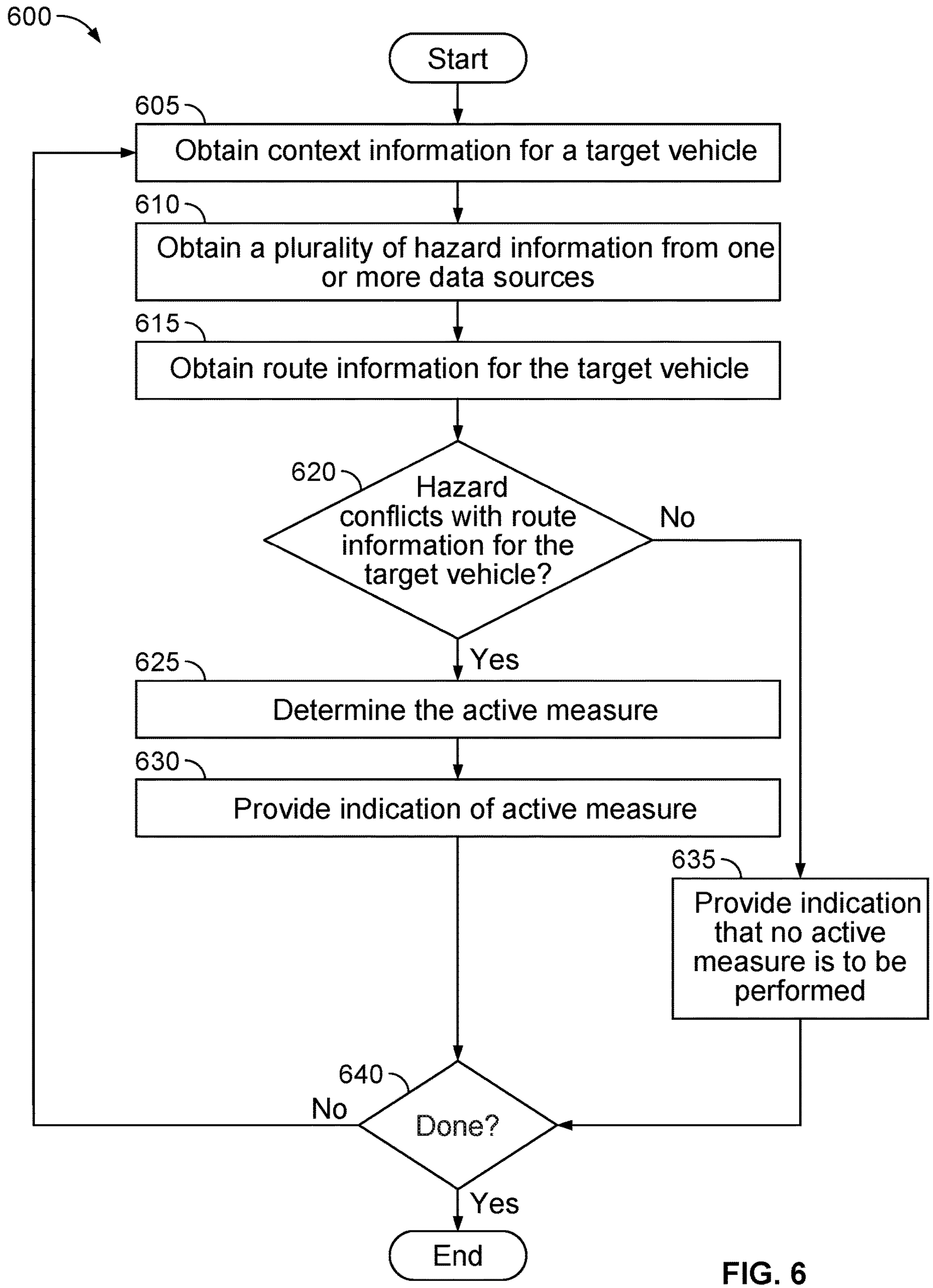
FIG. 6 is a flow diagram of a method for providing an indication of an active measure to be performed with respect to one or more managed vehicles according to various embodiments of the present application.

FIG. 6 is a flow diagram of a method for providing an indication of an active measure to be performed with respect to one or more managed vehicles according to various embodiments of the present application. In some embodiments, process 600 is implemented by system 100 of FIG. 1 and/or system 200 of FIG. 2. In some embodiments, process 600 is invoked by 315 and/or 320 of process 300 of FIG. 3, and/or 520 of process 500 of FIG. 5.

At 605, context information for a target vehicle is obtained. In some embodiments, 505 corresponds to, or is similar to, 305 of process 300 of FIG. 3.

At 610, a plurality of hazard information is obtained from one or more data sources. The one or more data sources may include a third-party service (e.g., a weather service, a traffic service, etc.) or managed vehicle (e.g., sensors mounted to a managed vehicle). In some embodiments, 510 corresponds to, or is similar to, 310 of process 300 of FIG. 3.

At 615, route information is obtained for the target vehicle. In some embodiments, 615 corresponds to, or is similar to, 410 of process 400 of FIG. 4.

At 620, the system determines whether a hazard conflicts with the route information for the target vehicle. In some embodiments, the system determines that a hazard conflicts with the route for the target vehicle in response to determining that the target vehicle is expected to be impacted by the hazard (e.g., if the target vehicle continues along the route). As an example, the system determines that the target vehicle is expected to be impacted by the hazard based on a predicted likelihood that the target vehicle is to be impacted by the hazard. As another example, the system determines that the target vehicle is expected to be impacted by the hazard based on a determination that the hazard is within a predefined distance threshold of the target vehicle or a part of the route of the vehicle. As another example, the system determines that the target vehicle is expected to be impacted by the hazard based on a determination that the hazard area corresponding to the hazard intersects with the route of the target vehicle.

In response to determining that the hazard conflicts with the route information for the target vehicle at 620, process 600 proceeds to 625. Conversely, in response to determining that the hazard does not conflict with the route information for the target vehicle at 620, process proceeds to 635.

At 625, the active measure is determined. In some embodiments, 625 corresponds to, or is similar to, 525 of process 500 of FIG. 5.

At 630, an indication of the active measure is provided. As an example, the system returns to 520 of process 500 an indication that an active measure is to be performed and information pertaining to the active measure, such as a type of active measure, etc.

At 635, an indication that no active measure is to be performed is provided. As an example, the system returns to 520 of process 500 an indication that no active measure is to be performed.

At 640, a determination is made as to whether process 600 is complete. In some embodiments, process 600 is determined to be complete in response to a determination no further active measures are to be performed, no further determinations of whether to preform active measures for particular managed vehicles are to be performed, no managed vehicles are connected to the fleet management service, a user has exited the system, a user indicates that process 600 is to be paused or stopped, etc. In response to a determination that process 600 is complete, process 600 ends. In response to a determination that process 600 is not complete, process 600 returns to 605.

Figure 7:
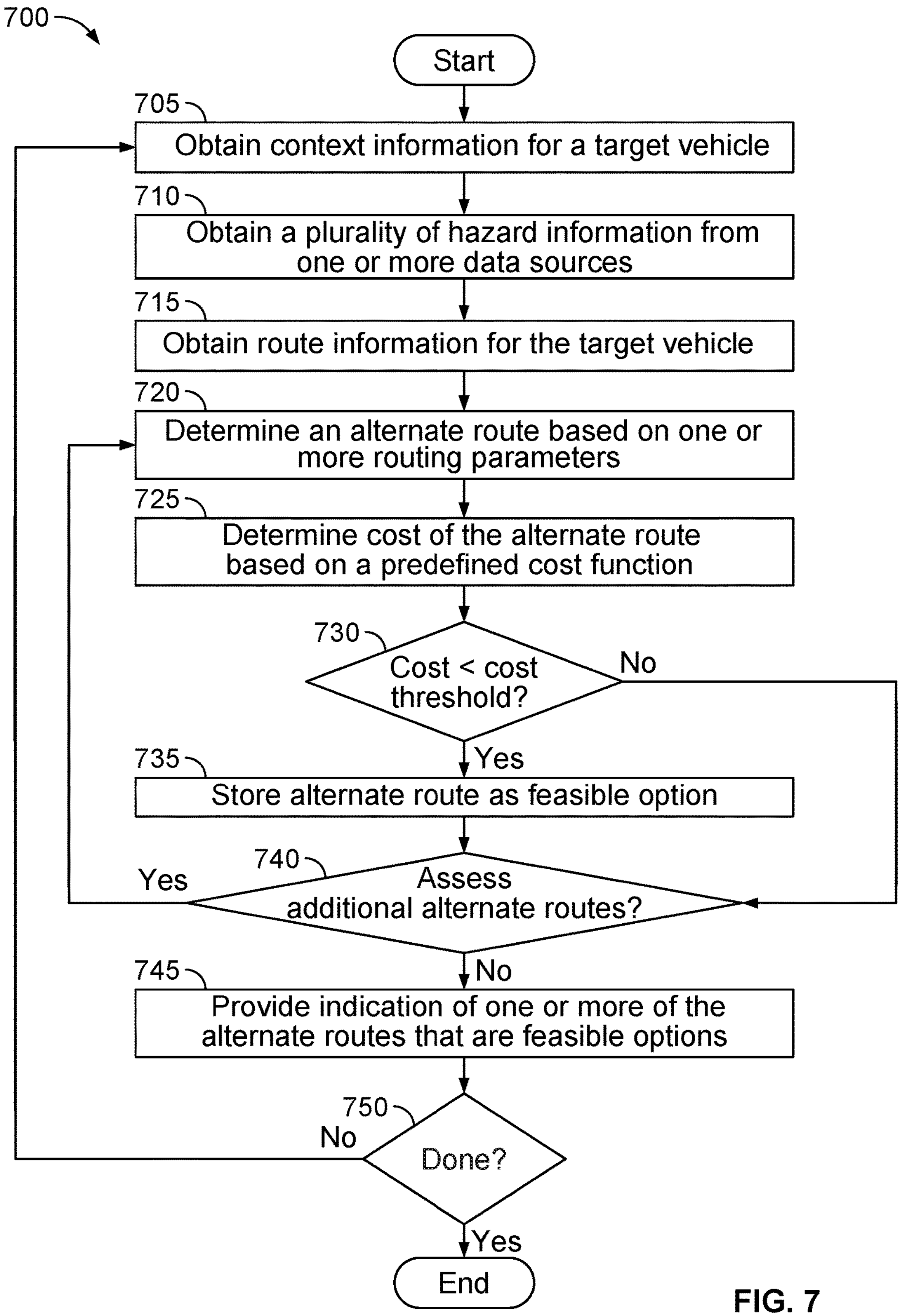
FIG. 7 is a flow diagram of a method for recommending an active measure with respect to one or more managed vehicles according to various embodiments of the present application.

FIG. 7 is a flow diagram of a method for recommending an active measure with respect to one or more managed vehicles according to various embodiments of the present application. In some embodiments, process 700 is implemented by system 100 of FIG. 1 and/or system 200 of FIG. 2. In some embodiments, process 700 is invoked by 315 and/or 320 of process 300 of FIG. 3, 520 of process 500 of FIG. 5, and/or 625 of process 600 of FIG. 6.

At 705, context information for a target vehicle is obtained. In some embodiments, 705 corresponds to, or is similar to, 605 of process 600 of FIG. 6.

At 710, a plurality of hazard information is obtained from one or more data sources. In some embodiments, 710 corresponds to, or is similar to, 610 of process 600 of FIG. 6.

At 715, route information is obtained for the target vehicle. In some embodiments, 715 corresponds to, or is similar to, 615 of process 600 of FIG. 6.

At 720, an alternate route is determined based on one or more routing parameters. In some embodiments, the system determines the alternate route in response to determining to perform an active measure or in response to a request received from a user (e.g., the fleet manager, a driver, etc.). The system determines the alternate route based on a current location of the managed vehicle, a destination location of the managed vehicle, a driving condition (e.g., a hazardous driving condition) within a geographic area corresponding to the current location and destination location, etc. Various other factors may be used in connection with routing the managed vehicle, such as characteristics of the managed vehicle (e.g., size or weight of the managed vehicle, type of payload), characteristics of the driver of the managed vehicle (e.g., the driver's experience level or history of driving), a severity of the driving condition expected to impact the geographic area, a type of driving condition (e.g., road closure, traffic, snowstorm, etc.). The one or more predefined parameters may correspond to a predefine set of rules that are configured on a fleet, managed vehicle, or driver basis. Examples of rules include avoid toll roads, avoid freeways, minimize distance traveled on city roads, avoid high road bank parts of roads, avoid high curvatures in the road, an acceptable proximity of a hazard, etc.

At 725, a cost of the alternate route is determined. In some embodiments, the system determines the cost of the route based at least in part on a predefined function. In some embodiments, the routing for the managed vehicle is determined based at least in part on a cost function and/or one or more predefined parameters. For example, the cost function includes variables such as distance, speed, expected time of arrival, likelihood of a driving condition occurring along the route, a severity of a driving condition along the route, an amount of tolls incurred along the route, a traffic congestion, etc.

At 730, the system determines whether the cost of the alternate route is less than a predefined cost threshold. The system compares the cost of the alternate route to the predefined cost threshold and/or the current route to determine whether the alternate route has an acceptable cost or is cheaper than the current route. The predefined cost threshold may be configured by a fleet manager or set according to a routing policy.

In response to determining that the cost of the alternate route is less than the predefined cost threshold at 730, process 700 proceeds to 735. Conversely, in response to determining that the cost of the alternate route is not less than the predefined cost threshold, process 700 proceeds to 740.

At 735, the alternate route is stored as a feasible option. The system may store a set of feasible options for routing a particular target vehicle. In some embodiments, the system stores the cost or other characteristics of the alternate route (e.g., expected arrival time, decrease in collision or adverse effect probability, etc.).

At 740, the system determines whether to assess any additional alternate routes. In some embodiments, the system determines whether to assess any additional alternate routes based at least in part on a preset number of alternate routes. The preset number of alternate routes may be set by the fleet manager or a routing policy to ensure that a reasonable set of routes are computed and compared. For example, the system compares the number of stored alternate routes as feasible options for routing the target vehicle to the preset number of alternate routes and determines whether additional alternate routes are to be determined.

In some embodiments, the system determines whether to assess any additional alternate routes based at least in part on a preset number of routes having a cost less than a cost threshold. For example, the system iterates over 720-740 until a set of feasible options for alternate routes is equal to the preset number of routes having the cost less than the cost threshold.

In some embodiments, the system determines whether to assess any additional alternate routes based on a runtime for process 700. For example, after a predetermined amount of time has lapsed since process 700 was invoked, the system may determine that no further alternate routes are to be assessed.

In response to determining that the system is to assess an additional alternate route(s) at 740, process 700 returns to 720 and process 700 iterates over 720-740 until no further alternate routes are to be assessed. Conversely, in response to determining that no further alternate routes are to be assessed at 740, process 700 proceeds to 745.

At 745, an indication of the one or more alternate routes that are feasible options are provided. As an example, the system returns to 520 of process 500 an indication that an active measure is to be performed and information pertaining to the active measure, such as a type of active measure, a set of alternate routes that are feasible options, etc.

At 750, a determination is made as to whether process 700 is complete. In some embodiments, process 700 is determined to be complete in response to a determination no further active measures are to be performed, no further determinations of whether to preform active measures for particular managed vehicles are to be performed, no managed vehicles are connected to the fleet management service, a user has exited the system, a user indicates that process 700 is to be paused or stopped, etc. In response to a determination that process 700 is complete, process 700 ends. In response to a determination that process 700 is not complete, process 700 returns to 705.

Figure 8:
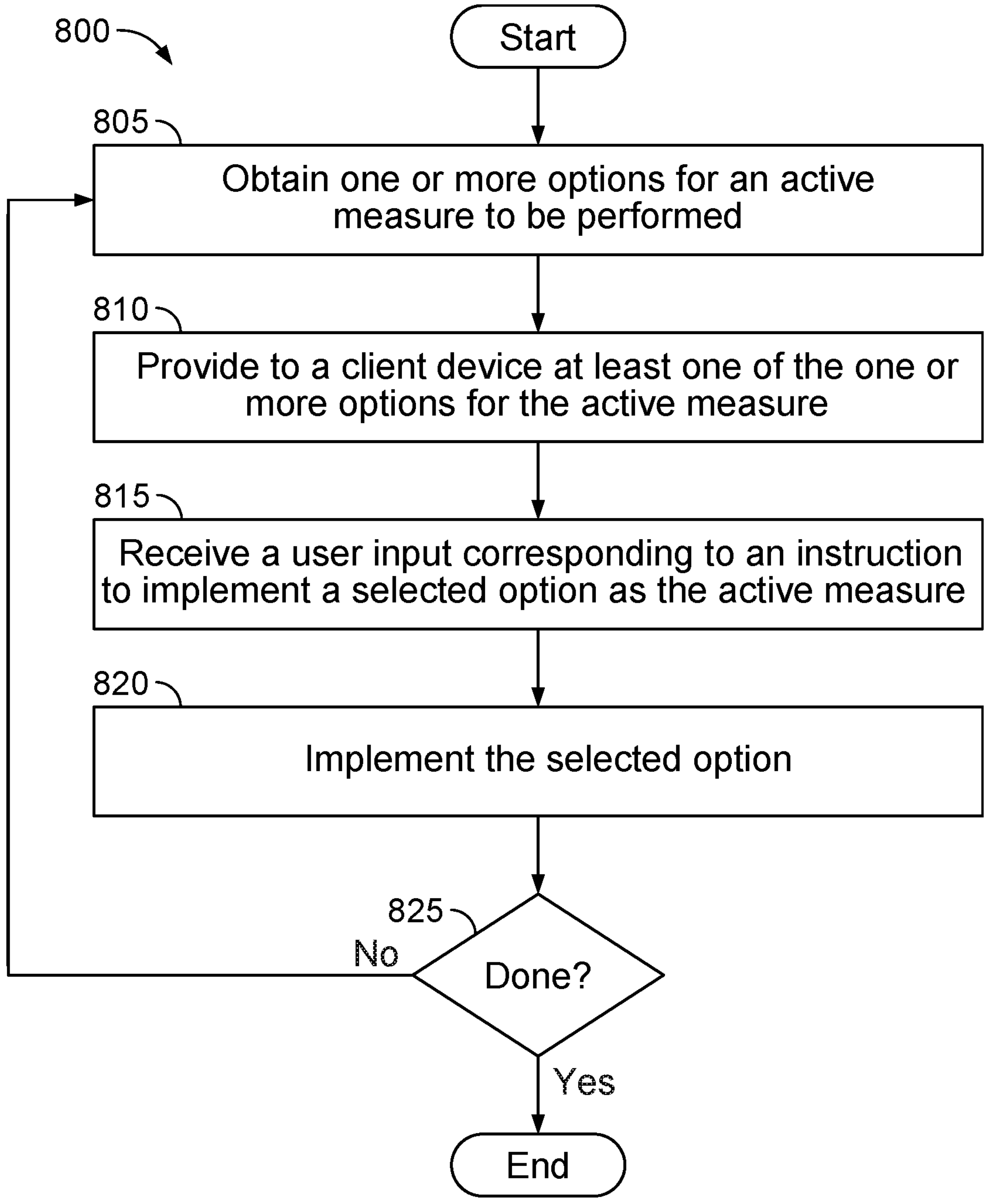
FIG. 8 is a flow diagram of a recommending an active measure and implementing a selected active measure with respect to one or more managed vehicles according to various embodiments of the present application.

FIG. 8 is a flow diagram of a recommending an active measure and implementing a selected active measure with respect to one or more managed vehicles according to various embodiments of the present application. In some embodiments, process 800 is implemented by system 100 of FIG. 1 and/or system 200 of FIG. 2.

At 805, one or more options for an active measure to be performed are obtained. In some embodiments, the system obtains a set of possible active measures that may be performed for a target vehicle. For example, the system obtains the set of feasible options stored at 735 of process 700. The one or more options for an active measure to be performed is obtained from a memory, such as from a mapping of target vehicles to sets of possible/feasible active measures.

At 810, at least one of the one or more options for the active measure is provided to a client device. In some embodiments, the system configures a user interface to include an indication of the at least one active measure and causes a client device to display the user interface. For example, the user interface is configured with selectable options corresponding to the at least one active measure. The set of options may be presented in a menu or a list. In some embodiments, the system configures the user interface to include information associated with the set of options, such as estimated time of arrival, amount of time saved compared to the current routing, an amount of tolls incurred, a decrease in the likelihood of a negative event (e.g., a collision, etc.) occurring, etc. In some embodiments, the client device corresponds to a computer system operated by a fleet manager, or a computer system associated with a target vehicle and operated by a driver of the managed vehicle.

At 815, a user input is received. The user input corresponds to an instruction to implement a selected option as the active measure.

At 820, the selected option is implemented. In response to receiving the user input, the system determines the selected option based on the user input and causes the corresponding active measure to be implemented. For example, in the case of a selected option corresponding to a re-routing of a target vehicle, the system determines the re-routing of the target vehicle. As another example, in the case of a selected option corresponding to a retrieval and display of a current image (e.g., associated with a route of the target vehicle, etc.), the system causes the current image to be displayed at the client device. Various other types of selected options may be implemented.

At 825, a determination is made as to whether process 800 is complete. In some embodiments, process 800 is determined to be complete in response to a determination no further active measures are to be performed, no further options for active measures are to be provided to a user, a determination that the selected active measure was successfully implemented, a user has exited the system, a user indicates that process 800 is to be paused or stopped, etc. In response to a determination that process 800 is complete, process 800 ends. In response to a determination that process 800 is not complete, process 800 returns to 805.

Figure 9:
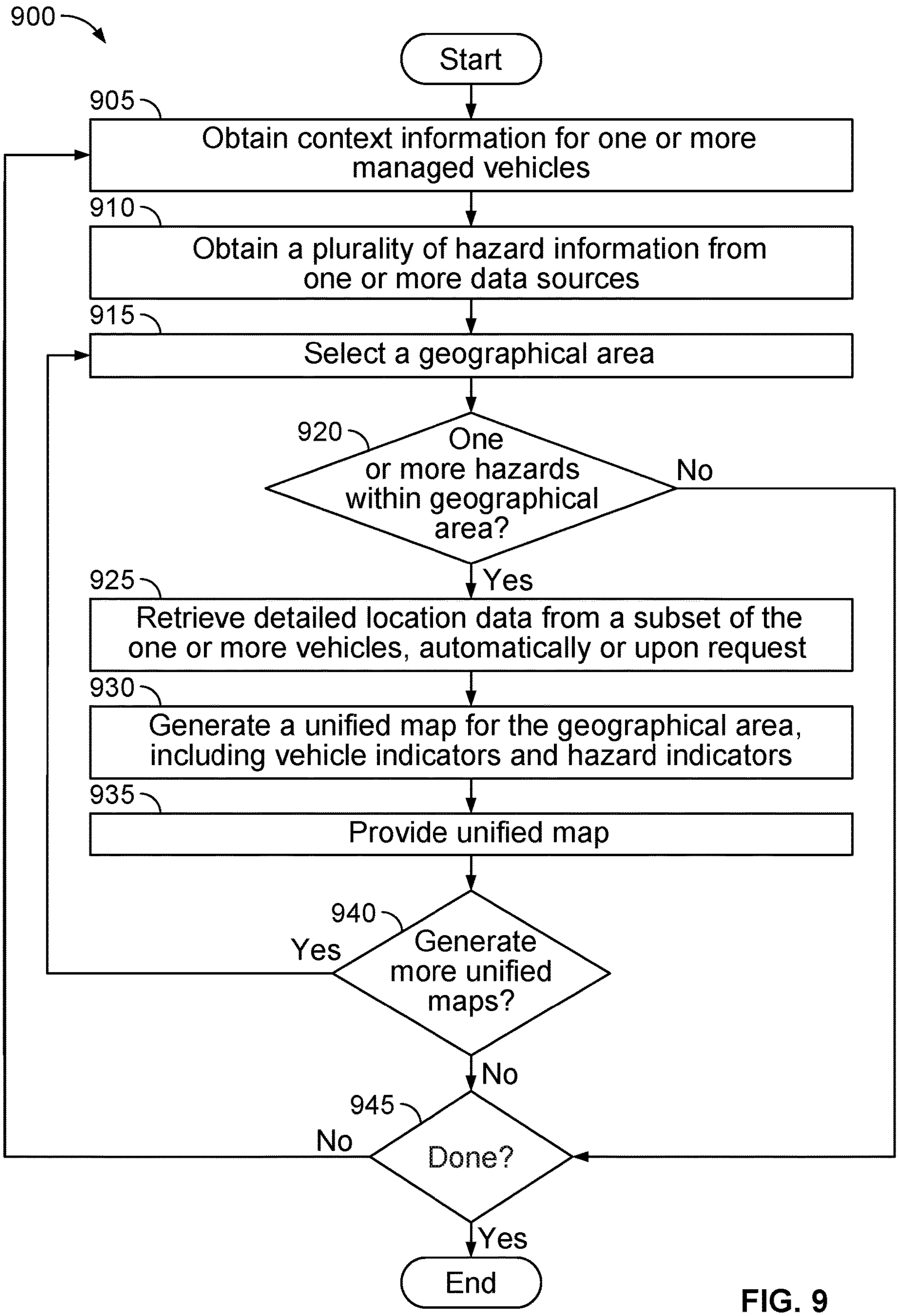
FIG. 9 is a flow diagram of a method for generating a unified map associated with a geographic area for one or more managed vehicles according to various embodiments of the present application.

FIG. 9 is a flow diagram of a method for generating a unified map associated with a geographic area for one or more managed vehicles according to various embodiments of the present application. In some embodiments, process 900 is implemented by system 100 of FIG. 1 and/or system 200 of FIG. 2.

At 905, context information for a target vehicle is obtained. In some embodiments, 905 corresponds to, or is similar to, 705 of process 700 of FIG. 7.

At 910, a plurality of hazard information is obtained from one or more data sources. In some embodiments, 910 corresponds to, or is similar to, 710 of process 700 of FIG. 7.

At 915, a geographical area is selected. For example, a user selects a geographical area by scrolling, by panning, and/or by zooming the map or by searching in a map search box for a location, a vehicle, or a driver, or by any other appropriate method. In some embodiments, the system selects the geographical area based at least in part on a current location of a managed vehicle, or a route of the managed vehicle. For example, the system selects the geographical area to be an area within a predefined distance of the current location of the managed vehicle. As another example, the geographical area corresponds to an area that is large enough to include a predefined set of managed vehicles (e.g., a fleet of vehicles, etc.).

At 920, the system determines whether one or more hazards are within the selected geographical area. The system uses the plurality of hazard information and the geographical area to determine whether the geographical area comprises any hazards.

In response to determining that one or more hazards are within the selected geographical area at 920, process 900 proceeds to 925. Conversely, in response to determining that the selected geographical area does not have any hazards therein at 920, process 900 proceeds to 945.

At 925, detailed location data is/are retrieved from a subset of the one or more vehicles, automatically or upon request. For example, detailed location data is obtained from a database or directly requested from a vehicle related to a location of interest. In various embodiments, detailed location data from a vehicle comprises one or more of the following: data from a managed vehicle, image(s) from a vehicle event recorder, current speed of a vehicle, weather information from a vehicle (e.g., temperature), windshield wiper status (e.g., switched on, switched off, etc.), vehicle event recorder accelerometer data, global positioning system (GPS) data (e.g., vehicle event recorder GPS or vehicle GPS data), weather data related to the location from a vehicle, traffic information related to the location from a vehicle, event data related to the location from a vehicle, or any other appropriate detailed data related to a location. In some embodiments, the system determines the one or more vehicles from which the system is to retrieve a current image(s) or other detailed location data based at least in part on a proximity to the hazard or if the system has not retrieved a current image, detailed location data, or vehicle data, the system can retrieve a current image, vehicle data, or detailed location data upon request (e.g., a user clicking on a vehicle and selecting to retrieve a current image or detailed location data from the vehicle). For example, the system determines the managed vehicle(s) within a predefined distance threshold of the hazard(s) and sends a request to the identified managed vehicles to capture and send a current image or current other detailed location data or vehicle data. In some embodiments, the system determines the one or more vehicles from which the system is to retrieve the current image(s) or other detailed location data based at least in part on a location of a target vehicle for which routing is being managed and a set of vehicles within proximity of the target vehicle.

In some embodiments, the system retrieves the current image(s) from the subset of the one or more vehicles based at least in part on querying the dataset storing current images. For example, the system queries the dataset for a recent image (e.g., an image that was captured within a threshold time period). In some embodiments, images are automatically chosen based on rank of the location, which is based on one or more of: a road type, an average daily traffic, a proximity from route risk crash hazards, current weather, current traffic, etc. The system may use one or more other parameters in connection with querying the dataset, such as a location, a hazard, a managed vehicle, etc. For example, the system searches for the last captured image closest to the managed vehicle or hazards.

In various embodiments, vehicle data or detailed location data related to a vehicle comprise one or more of the following: a current temperature, a minimum temperature (e.g., a low temperature within the last 24 hours), a maximum temperature (e.g., a high temperature within the last 24 hours), traffic information (e.g., video information, speed information, location information, camera information, traffic determination information derived from images, video, speed, location, etc.), weather condition information (e.g., wiper information, brake lock information, video information, speed information, location information, camera information, weather determination information derived from images, video, speed, location, etc.), precipitation/snow/sleet information (e.g., wiper information, brake lock information, video information, speed information, location information, camera information, precipitation/snow/sleet determination information derived from images, video, speed, location, etc.), vehicle activity information (e.g., position information, ignition information, parking brake information, etc.), or any other appropriate vehicle information. In various embodiments, vehicle data comprises one or more of the following: external database data (e.g., crash data, hot spot data, traffic data, weather data, etc.), fleet database data, news organization data, or any other appropriate data.

At 930, a unified map is generated for the geographical area. The unified map includes vehicle indicators for a managed vehicle(s) within the geographical area and a hazard indicator(s) for a hazard(s) within the geographical area. In some embodiments, the system generates the unified map based on generating a plurality of layers respectively comprising different information. For example, the unified map includes a first layer comprising indicators of the managed vehicles within the geographic area. As another example, the unified map includes a second layer(s) comprising indicators of the hazards within the geographic area. As another example, the unified map includes a third layer comprising traffic data. As another example, the unified map includes a fourth layer comprising road data. Various other layers may be implemented.

In various embodiments, the unified map comprises one or more of the following: a virtual camera layer (e.g., enabling showing images from a vehicle), a traffic layer, a weather warning layer (e.g., enabling showing warnings over specific geographic areas like floods, tornadoes, hurricanes, blizzards, fog, etc.), a current temperature layer (e.g., enabling showing a colored map layer showing temperature across a map area such as the country, county, state, etc.), a minimum temperature layer (e.g., enabling showing areas where it will freeze today), a maximum temperature layer (e.g., enabling showing where over-heating and heat related problems will be issues), a precipitation layer (e.g., enabling showing where and how much it will rain), a snow/sleet layer (e.g., enabling a combination of showing where it will precipitate and where the temperature will be low), a route risk layer (e.g., enabling showing where event or crash hotspots are most likely to occur and under what circumstances), an active vehicle layer (e.g., enabling showing location, speed, heading for all of a customer's vehicles that are moving or have moved in the last 24 hours), or any other appropriate layer. In some embodiments, the active layer can be used to see which vehicles are currently in weather warning areas, are entering precipitation areas, are entering snow/sleet areas, are entering precipitation areas and cold condition areas, are in heavy traffic, are approaching route risk locations, etc.

At 935, the unified map is provided. In some embodiments, the system provides the unified map to a client system, such as to an administrator or operator performing fleet management, or to one or more managed vehicles within the geographical area.

At 940, the system determines whether to generate another unified map (or more unified maps). In some embodiments, the system determines to generate unified maps for each managed vehicle, or a selected subset of the managed vehicles in a fleet.

In response to determining that more unified maps are to be generated at 940, process 900 returns to 915 and process 900 iterates over 915-940 until no further unified maps are to be generated. Conversely, in response to determining that no further unified maps are to be generated at 940, process 900 proceeds to 945.

At 945, a determination is made as to whether process 900 is complete. In some embodiments, process 900 is determined to be complete in response to a determination no further unified maps are to be generated, no further managed vehicles exist for which a unified map has not been generated, a user has exited the system, a user indicates that process 900 is to be paused or stopped, etc. In response to a determination that process 900 is complete, process 900 ends. In response to a determination that process 900 is not complete, process 900 returns to 905.

Figure 10:
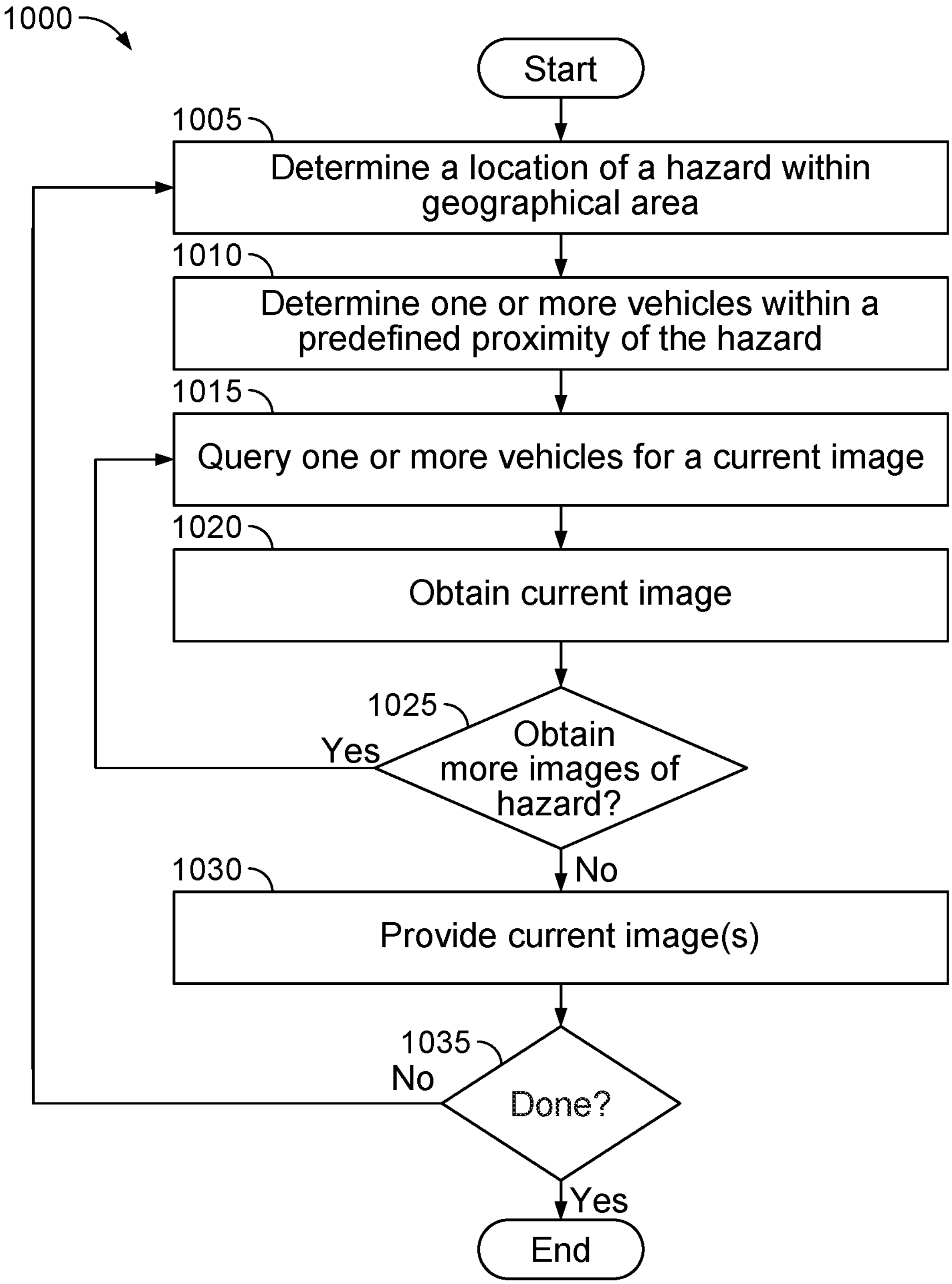
FIG. 10 is a flow diagram of a method for retrieving a current image captured by a vehicle according to various embodiments of the present application.

FIG. 10 is a flow diagram of a method for retrieving a current image captured by a vehicle according to various embodiments of the present application. In some embodiments, process 1000 is implemented by system 100 of FIG. 1 and/or system 200 of FIG. 2. In some embodiments, process 1000 is invoked in connection with the generating of a unified map, such as at 930 of process 900 of FIG. 9.

At 1005, a location of a hazard within the geographical area is determined. In some embodiments, the system uses the hazard information (e.g., driving information) to determine a location within the geographical area impacted by the hazard.

At 1010, one or more vehicles within a predefined proximity of the hazard are determined. The system uses current location data for a set of managed vehicles to identify one or more vehicles within the predefined proximity of the hazard.

At 1015, the one or more vehicles within the predefined proximity of the hazard are queried for a current image. For example, the system instructs vehicles to capture the image (e.g., in real time), or queries the vehicle(s) for images taken in proximity to the hazard within a predefined time limit.

In some embodiments, the system does not query active vehicles around a particular location. Instead, the system subscribes to location updates for all vehicles and when a location update is received for a given vehicle if data for that location is needed the vehicle id, timestamp, location and other vehicle data is stored associated with the grid square or cell. In some embodiments, at least one vehicle's data per grid square is stored that is current (e.g., within 10 minutes, within 30 minutes, etc.) or at least one vehicle's data is stored that is valid (e.g., within 24 hours, within 1 week, etc.). In response to a request for data related to a hazard, the grid square in which the hazard is located is identified and the vehicle data related to that grid square is obtained along with vehicle metadata (e.g., vehicle identifier, time stamp, date stamp, etc.). In some embodiments, one or more images associated with the vehicle data are not yet uploaded so the system provides a request to the vehicle using the vehicle identifier and a timestamp and retrieves relevant data from the vehicle (e.g., image(s), video(s), sensor data, weather data, temperature data, etc.). In some embodiments, a plurality of vehicle's data (e.g., 1 to 5 vehicles) is stored per grid square so that the data from each could be obtained (e.g., in order of being recent and/or available to be viewed or retrieved—for example, some data may be available in the database/map already, some data may be accessible due to the vehicle being connected via a wireless/cellular connection, some data may not be accessible due to the vehicle not being connected via a wireless/cellular connection, etc.). In some embodiments, the system detailed information around a hazard location may not be sufficiently covered using a larger grid square map segmentation so a second set of smaller squares/circles may be created (e.g., around each route risk crash hazard) that are populated with vehicle data similar to the larger grid square map segmentation.

At 1020, a current image is obtained. The system obtains the current image based on the querying the one or more vehicles within the predefined proximity of the hazard. In some embodiments, in response to determining that no managed vehicles are within a predefined proximity of the hazard, the system queries a database for an image within the area (e.g., within proximity of the hazard). For example, the system queries the database for a recent image (e.g., an image that was captured within a predefined time limit, such as 15 minutes.

At 1025, the system determines whether to obtain another image(s) of the hazard. The system may determine to obtain another image(s) of the hazard based on a size of the hazard, a number of managed vehicles within proximity of the hazard, an analysis of the images already obtained (e.g., to determine whether an image is sufficiently clear or shows the hazard).

In response to determining to obtain more images of the hazard at 1025, process 1000 returns to 1015 and process 1000 iterates over 1015 until no further images of the hazard are to be obtained. Conversely, in response to determining that no further images of the hazard are to be obtained at 1025, process 1000 proceeds to 1030.

At 1030, the current image(s) are provided. In some embodiments, the current image(s) are provided to a process for generating a unified map, or for managing one or more vehicles. In some embodiments, the system provides the current image(s) to a client system, such as to a fleet administrator/manager, a managed vehicle, etc. For example, the system configures a user interface to provide a link to the current image(s) or to otherwise display the current image(s), and the system causes the client system to display the user interface to the corresponding user.

At 1035, a determination is made as to whether process 1000 is complete. In some embodiments, process 1000 is determined to be complete in response to a determination no further unified maps are to be generated, no further images are to be obtained for hazards within the geographical area, the geographical area does not include any further hazards for which images are to be obtained/provided, no further managed vehicles exist for which a unified map has not been generated, a user has exited the system, a user indicates that process 1000 is to be paused or stopped, etc. In response to a determination that process 1000 is complete, process 1000 ends. In response to a determination that process 1000 is not complete, process 1000 returns to 1005.

Figure 11A:
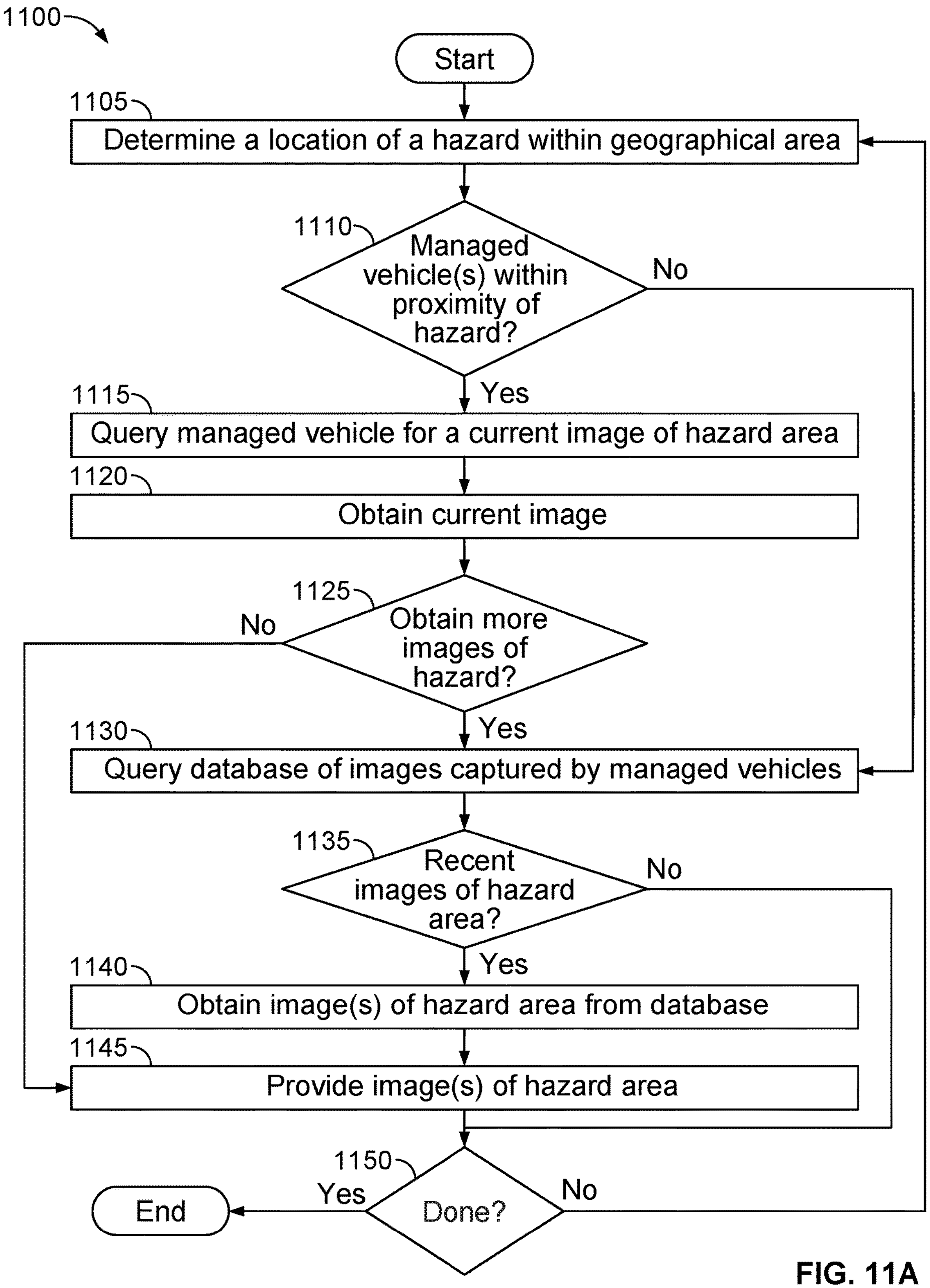
FIG. 11A is a flow diagram of a method for retrieving an image for a hazard area according to various embodiments of the present application.

FIG. 11A is a flow diagram of a method for retrieving an image for a hazard area according to various embodiments of the present application. In some embodiments, process 1100 is implemented by system 100 of FIG. 1 and/or system 200 of FIG. 2. In some embodiments, process 1100 is invoked in connection with the generating of a unified map, such as at 930 of process 900 of FIG. 9, or in connection with obtaining an image, such as 1015 or 1020 of process 1000 of FIG. 10.

At 1105, a location of a hazard within the geographical area is determined. In some embodiments, 1105 corresponds to, or is similar to, 1005 of process 1000 of FIG. 10.

At 1110, the system determines whether one or more managed vehicle(s) are within proximity of the hazard. In some embodiments, a managed vehicle is deemed to be within proximity of the hazard if a current location (or expected location such as a point on the route at which the vehicle is expected to be at a certain time or within a certain time period) of the managed vehicle is within a predefined distance of the hazard. In some embodiments, 1110 corresponds to, or is similar to, 1010 of process 1000 of FIG. 10.

In response to determining that a managed vehicle(s) is within proximity of the hazard at 1110, process 1100 proceeds to 1115. Conversely, in response to determining that a managed vehicle(s) is not within proximity of the hazard at 1110, process 1100 proceeds to 1125.

At 1115, a managed vehicle is queried for a current image of the hazard area (e.g., the location at which the hazard). In response to identifying a managed vehicle within proximity of the hazard, the system queries the managed vehicle for a current image. For example, the system sends a request for the managed vehicle to capture an image using a camera mounted to the managed vehicle and to send the image to the system.

At 1120, the current image is obtained. For example, the system receives the current image from the managed vehicle.

At 1125, the system determines whether to obtain more images of the hazard. As an example, the system determines to obtain more images based at least in part on a time when other current images are captured. As an example, the system determines to obtain more images based on a determination that other vehicles are in proximity to the hazard.

In response to determining that more image(s) are to be obtained at 1125, process 1100 proceeds to 1130. Conversely, in response to determining that no further images are to be obtained, process 1100 proceeds to 1145.

At 1130, a database of images captured by managed vehicles is queried. The system queries the dataset of images based at least in part on a location of the hazard and a current time (e.g., to retrieve a recent image of the hazard).

At 1135, the system determines whether the database of images comprises recent images of the hazard area. In some embodiments, the system deems an image to be a recent image if the image was captured within a predefined time threshold.

In response to determining that the database of images comprises a recent image of the hazard area at 1135, process 1100 proceeds to 1140. Conversely, in response to determining that the database of images does not have any recent images of the hazard area at 1135, process 1100 proceeds to 1150.

At 1140, one or more images of the hazard area are obtained from the database. In response to determining that the database comprises a recent image(s) of the hazard, the system obtains one or mor more of such recent images.

At 1145, one or more images of the hazard area are provided. In some embodiments, the system provides the one or more images to a client system, such as a computer system used by a fleet manager or a driver. In some embodiments, the system provides the one or more images to a process/mechanism for generating the unified map (e.g., to include the image(s) within a layer of the unified map).

At 1150, a determination is made as to whether process 1100 is complete. In some embodiments, process 1100 is determined to be complete in response to a determination no further unified maps are to be generated, no further images are to be obtained for hazards within the geographical area, the geographical area does not include any further hazards for which images are to be obtained/provided, no further managed vehicles exist for which a unified map has not been generated, a user has exited the system, a user indicates that process 1100 is to be paused or stopped, etc. In response to a determination that process 1100 is complete, process 1100 ends. In response to a determination that process 1100 is not complete, process 1100 returns to 1105.

Figure 11B:
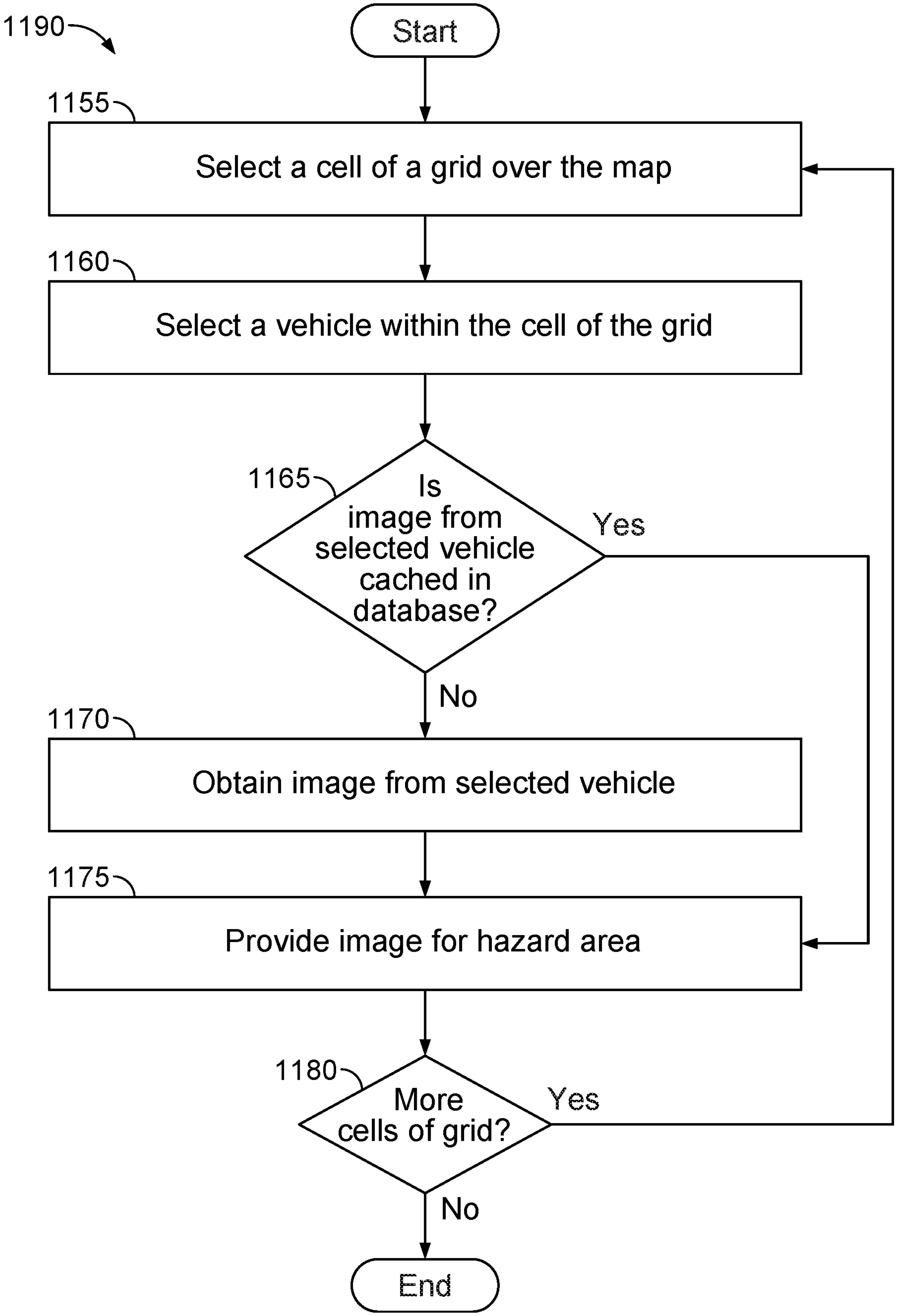
FIG. 11B is a flow diagram of a method for retrieving an image for a hazard area according to various embodiments of the present application.

FIG. 11B is a flow diagram of a method for retrieving an image for a hazard area according to various embodiments of the present application. In some embodiments, process 1190 is implemented by system 100 of FIG. 1 and/or system 200 of FIG. 2. In some embodiments, process 1190 is invoked in connection with the generating of a unified map, such as at 930 of process 900 of FIG. 9, or in connection with obtaining an image, such as 1015 or 1020 of process 1000 of FIG. 10.

In the example shown, in 1155 a cell of a grid over the map is selected. For example, a grid of cells is created over the map. In 1160, a vehicle is selected within the cell of the grid. For example, for each cell in the grid a vehicle is selected as a data point to be displayed. In some embodiments, a most recent vehicle data point is selected. In some embodiments, an older vehicle data point is selected (e.g., a data point with an associated image already acquired and stored on the vehicle or uploaded and stored in the database). In 1165, it is determined whether an image from the selected vehicle is cached in the database. For example, it is determined whether the vehicle has acquired and stored an image or that the image is uploaded and stored in a database. In response to there being an image from the selected vehicle cached in the database, control passes to 1175. In response to there not being an image from the selected vehicle cached in the database, in 1170 an image is obtained from the selected vehicle. For example, an image is fetched from the vehicle (e.g., a stored image in a vehicle event recorder) or an image is acquired and fetched from the vehicle (e.g., a new image is caused to be acquired from the vehicle and uploaded to a database). In 1175, the image is provided for the hazard area. For example, the image is provided for a map area associated with a hazard area for display, if desired. In 1180, it is determined whether there are more cells of the grid. For example, have all cells of the grid overlaid on the map been processed. In response to there being more cells of the grid, control passes to 1155. In response to there not being more cells of the grid, the process ends.

Figure 12:
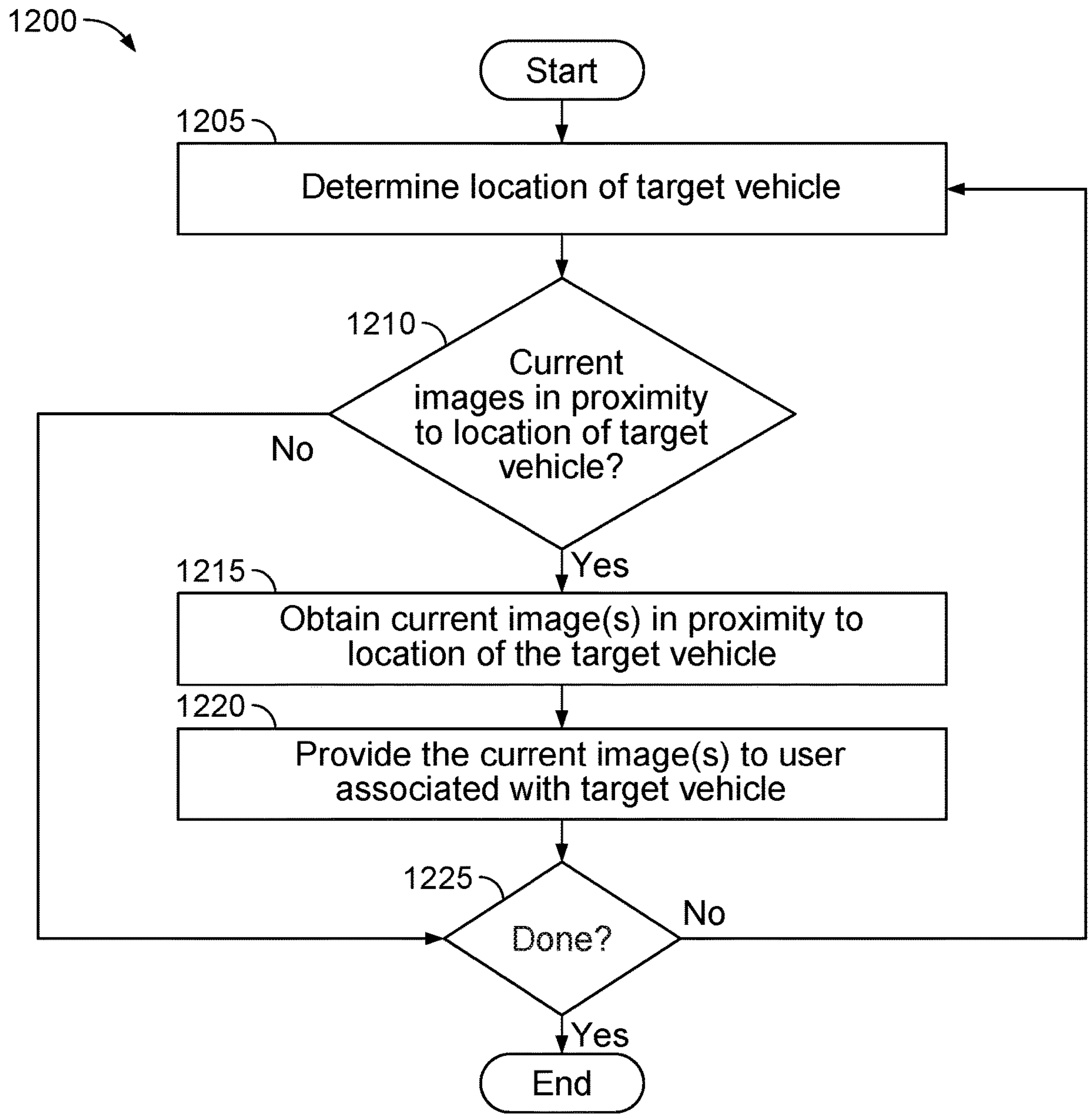
FIG. 12 is a flow diagram of a method for providing context information to a target vehicle among one or more managed vehicles according to various embodiments of the present application.

FIG. 12 is a flow diagram of a method for providing context information to a target vehicle among one or more managed vehicles according to various embodiments of the present application. In some embodiments, process 1200 is implemented by system 100 of FIG. 1 and/or system 200 of FIG. 2.

At 1205, a location of a target vehicle is determined. In some embodiments, 1205 corresponds to, or is similar to, 405 of process 400 of FIG. 4.

At 1210, the system determines whether a database of images has any current images in proximity to the location of the target vehicle. In some embodiments, 1210 corresponds to, or is similar to, 1130 and 1135 of process 1100 of FIG. 11.

In response to determining that database of images comprises a current image(s) in proximity to the location of the target vehicle at 1210, process 1200 proceeds to 1215. Conversely, in response to determining that the database of images does not comprise any current images at 1210, process 1200 proceeds to 1225.

At 1215, one or more current images in proximity to the location of the target vehicle are obtained. In some embodiments, 1215 corresponds to, or is similar to 1140 of FIG. 11.

At 1220, the one or more current images are provided to a user associated with the target vehicle. The system causes a user interface associated with the user (e.g., a computer system for a fleet manager, a managed vehicle system for a vehicle, etc.) to display the one or more current images. The one or more current images are comprised in a unified map (e.g., the images are included in a layer of the unified map).

At 1225, a determination is made as to whether process 1200 is complete. In some embodiments, process 1200 is determined to be complete in response to a determination no further images are to be obtained for hazards within proximity of a target vehicle, no further target vehicles are selected, a user has exited the system, a user indicates that process 1200 is to be paused or stopped, etc. In response to a determination that process 1200 is complete, process 1200 ends. In response to a determination that process 1200 is not complete, process 1200 returns to 1205.

Figure 13:
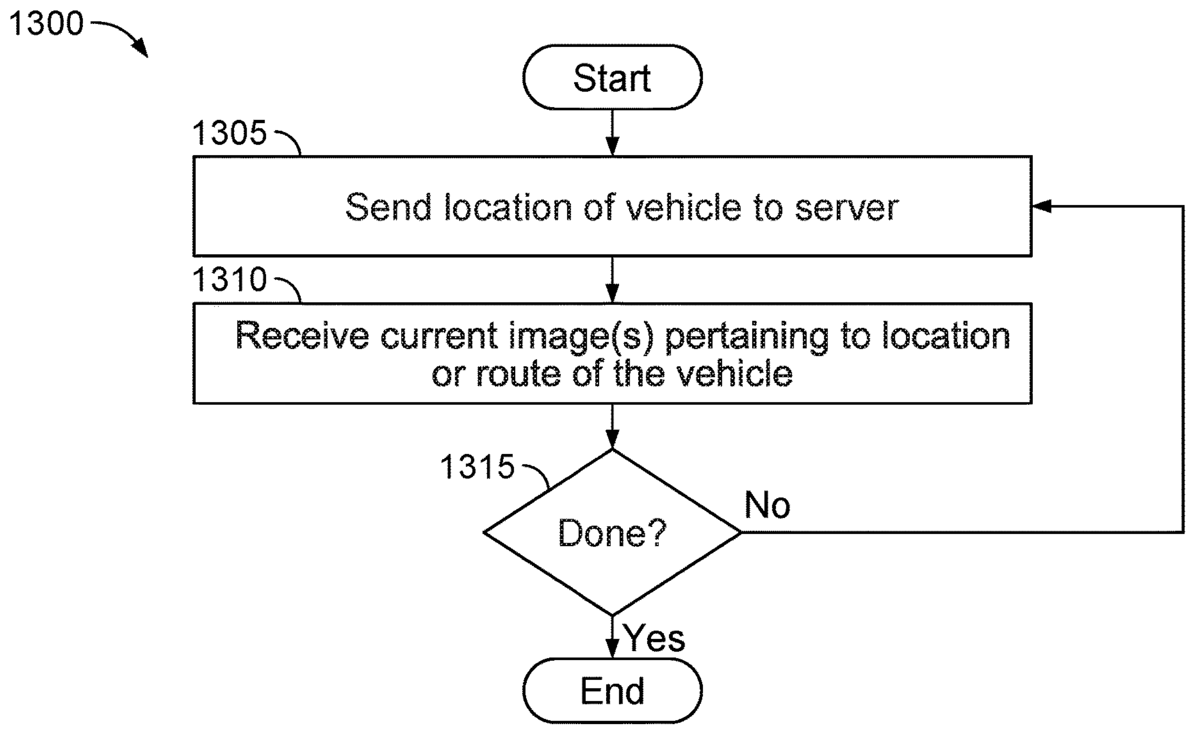
FIG. 13 is a flow diagram of a method for providing context information for a managed vehicle according to various embodiments of the present application.

FIG. 13 is a flow diagram of a method for providing context information for a managed vehicle according to various embodiments of the present application. In some embodiments, process 1300 is implemented by system 100 of FIG. 1 and/or system 200 of FIG. 2. In some embodiments, process 1300 is implemented by a computer system associated with a managed vehicle.

At 1305, the location of the vehicle is sent to a server. In some embodiments, the server is associated with a fleet management service that manages routing, etc. for the vehicle.

At 1310, one or more current images pertaining to the location of the vehicle, or a route of the vehicle are received. In some embodiments, the one or more current images are received from the server (e.g., the server associated with the fleet management service). The server determines a set of images pertaining to the location of the vehicle (e.g., recent images captured within a predefined distance of the location of the vehicle, etc.), and provides the image(s) to the managed vehicle.

At 1315, a determination is made as to whether process 1300 is complete. In some embodiments, process 1300 is determined to be complete in response to a determination no further unified maps are to be generated, no further images are to be obtained for hazards within proximity of the vehicle, the vehicle is disconnected from the server or fleet management service, the bandwidth of a connection between the vehicle and the server is less than a predefined threshold, a user associated with the vehicle (e.g., the driver) turns off the feature for receiving images pertaining to the vehicle or its route, a user has exited the system, a user indicates that process 1300 is to be paused or stopped, etc. In response to a determination that process 1300 is complete, process 1300 ends. In response to a determination that process 1300 is not complete, process 1300 returns to 1305.

Figure 14:
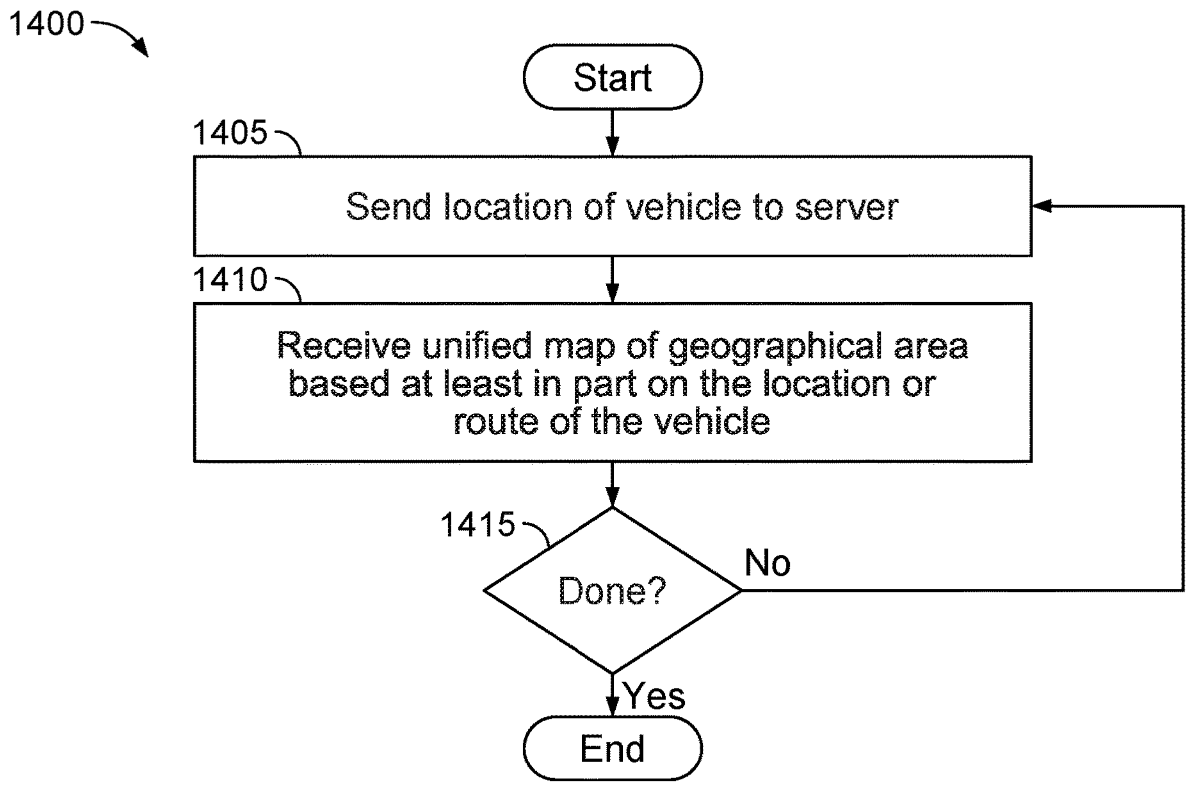
FIG. 14 is a flow diagram of a method for receiving information pertaining to a current route for a managed vehicle according to various embodiments of the present application.

FIG. 14 is a flow diagram of a method for receiving information pertaining to a current route for a managed vehicle according to various embodiments of the present application. In some embodiments, process 1400 is implemented by system 100 of FIG. 1 and/or system 200 of FIG. 2. In some embodiments, process 1400 is implemented by a computer system associated with a managed vehicle.

At 1405, the location of the vehicle is sent to a server. In some embodiments, the server is associated with a fleet management service that manages routing, etc. for the vehicle.

At 1410, a unified map pertaining to a geographical area of the vehicle is obtained. In some embodiments, the geographical area is determined based at least in part on the location of the vehicle or a route of the vehicle (e.g., an area within which the vehicle is expected to be within a predetermined time period). In some embodiments, the unified map is received from the server (e.g., the server associated with the fleet management service).

At 1415, a determination is made as to whether process 1400 is complete. In some embodiments, process 1400 is determined to be complete in response to a determination no further unified maps are to be generated, the vehicle is disconnected from the server or fleet management service, the bandwidth of a connection between the vehicle and the server is less than a predefined threshold, a user associated with the vehicle (e.g., the driver) turns off the feature for receiving images pertaining to the vehicle or its route, a user has exited the system, a user indicates that process 1400 is to be paused or stopped, etc. In response to a determination that process 1400 is complete, process 1400 ends. In response to a determination that process 1400 is not complete, process 1400 returns to 1405.

Figure 15:
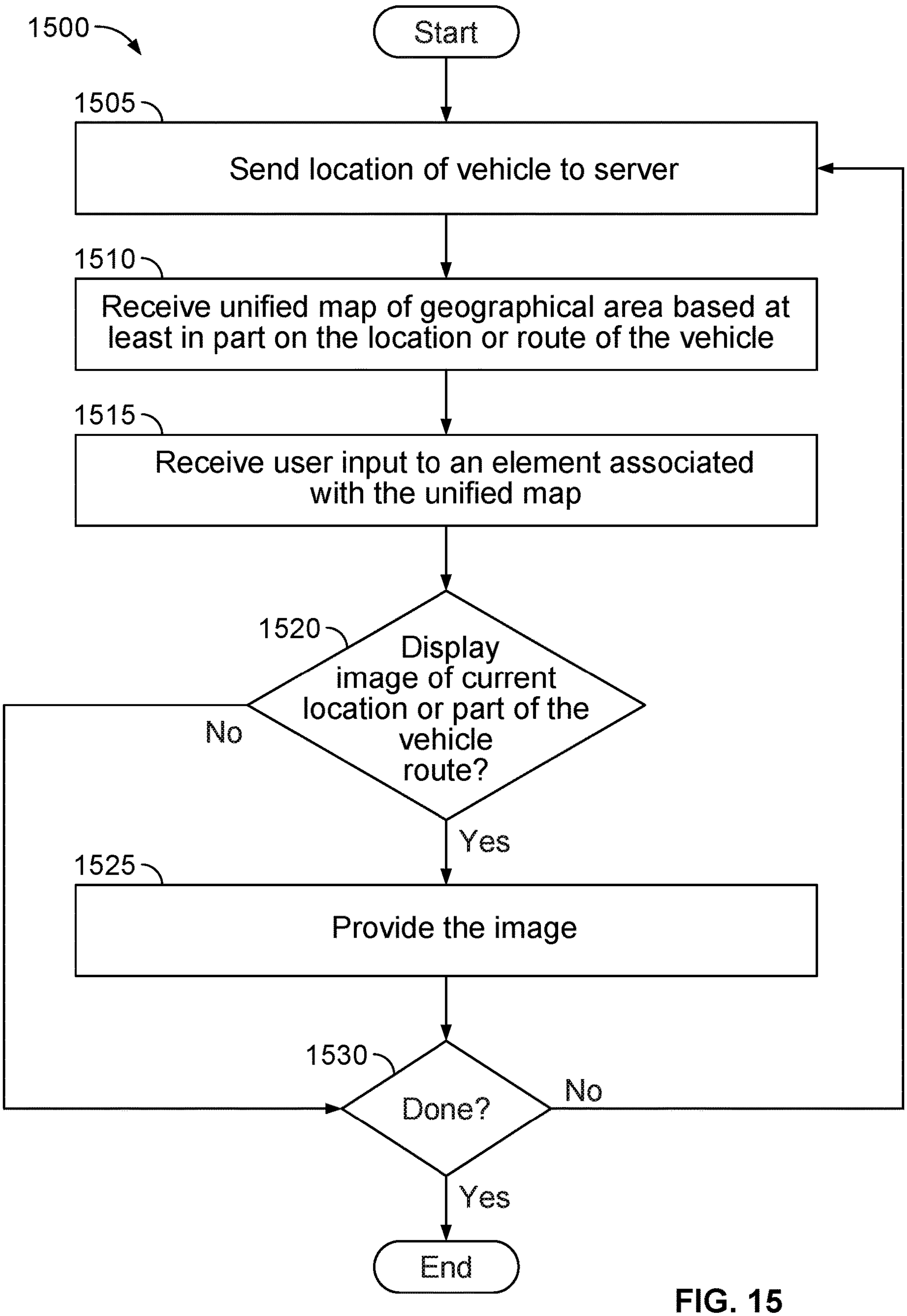
FIG. 15 is a flow diagram of a method for performing an active measure with respect to one or more managed vehicles according to various embodiments of the present application.

FIG. 15 is a flow diagram of a method for performing an active measure with respect to one or more managed vehicles according to various embodiments of the present application. In some embodiments, process 1500 is implemented by system 100 of FIG. 1 and/or system 200 of FIG. 2. In some embodiments, process 1500 is implemented by a computer system associated with a managed vehicle.

At 1505, the location of the vehicle is sent to a server. In some embodiments, the server is associated with a fleet management service that manages routing, etc. for the vehicle.

At 1510, a unified map pertaining to a geographical area of the vehicle is obtained. In some embodiments, the geographical area is determined based at least in part on the location of the vehicle or a route of the vehicle (e.g., an area within which the vehicle is expected to be within a predetermined time period). In some embodiments, the unified map is received from the server (e.g., the server associated with the fleet management service).

At 1515, a user input is received. The user input is input to an element associated with the unified map. In some embodiments, the element associated with the unified map is a menu item or a selectable element provided on a user interface. For example, the user input corresponds to selection of an active measure to perform, confirmation that an active measure is to be performed, etc. As another example, the user input corresponds to an indication for the system to provide an image of the current location of the vehicle or a current image of a location along the route of the vehicle, such as an image of a location of a hazard along the route.

At 1520, the system determines whether to display the image of the current location of the vehicle or the vehicle route. In some embodiments, the system determines to display the image based at least in part on the user input.

In response to determining the display the image of the current location of the vehicle or a part of the vehicle route at 1520, process 1500 proceeds to 1525. Conversely, in response to determining that that the image of the current location of the vehicle or the part of the vehicle route is not to be displayed, process 1500 proceeds to 1530.

At 1525, the image is provided. In some embodiments, the system configures a user interface to display the image. As an example, the user interface displays a map comprising route information for the vehicle and the image is provided as an overlay to the map, such as at a location of a corresponding hazard, etc.

At 1530, a determination is made as to whether process 1500 is complete. In some embodiments, process 1500 is determined to be complete in response to a determination no further unified maps are to be generated and provided to a vehicle, no further images are to be displayed on a computer system for the vehicle, the vehicle is disconnected from the server or fleet management service, the bandwidth of a connection between the vehicle and the server is less than a predefined threshold, a user associated with the vehicle (e.g., the driver) turns off the feature for receiving images pertaining to the vehicle or its route, a user has exited the system, a user indicates that process 1500 is to be paused or stopped, etc. In response to a determination that process 1500 is complete, process 1500 ends. In response to a determination that process 1500 is not complete, process 1500 returns to 1505.

Figure 16:
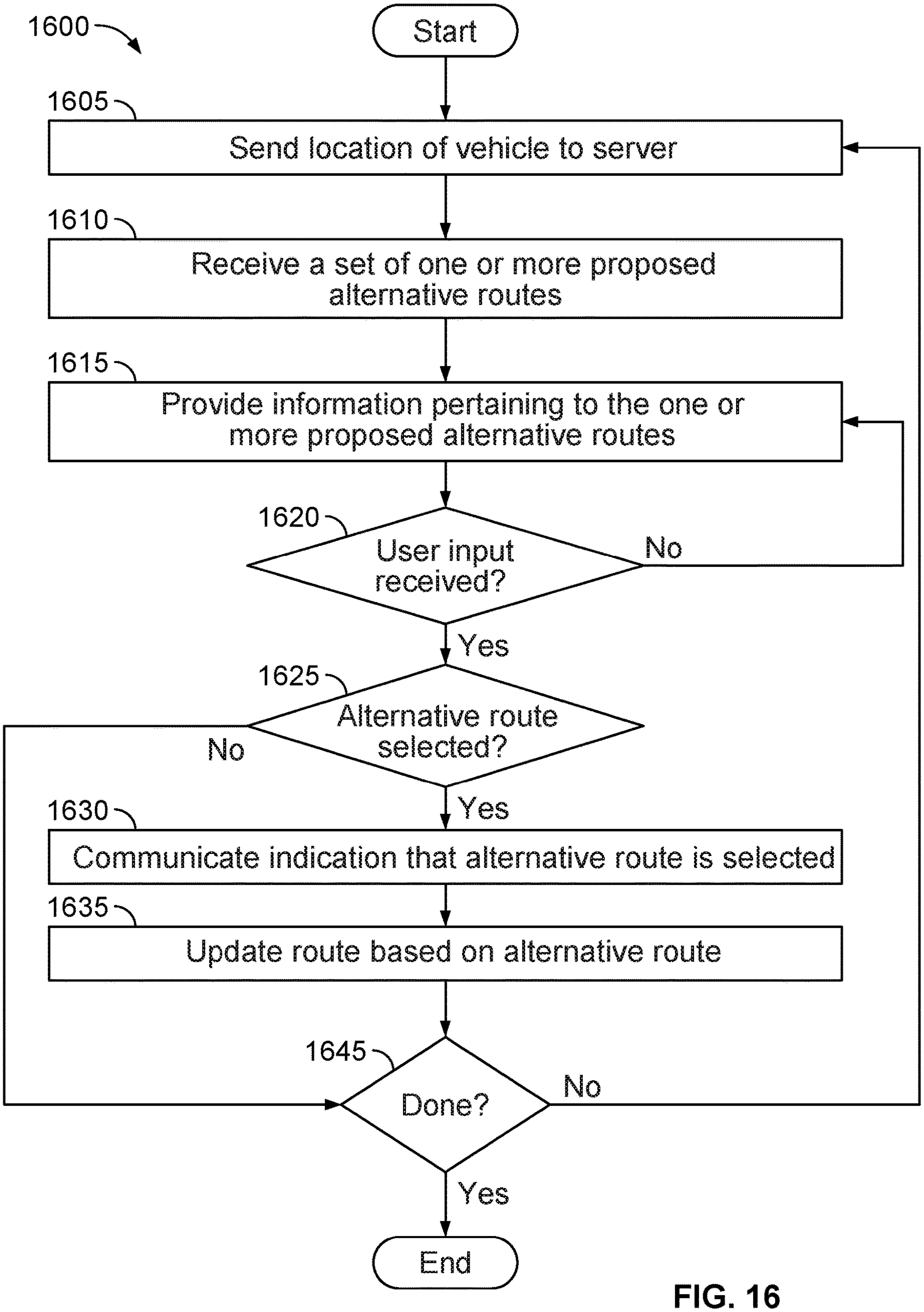
FIG. 16 is a flow diagram of a method for updating a route for one or more managed vehicles according to various embodiments of the present application.

FIG. 16 is a flow diagram of a method for updating a route for one or more managed vehicles according to various embodiments of the present application. In some embodiments, process 1600 is implemented by system 100 of FIG. 1 and/or system 200 of FIG. 2. In some embodiments, process 1600 is implemented by a computer system associated with a managed vehicle.

At 1605, the location of the vehicle is sent to a server. In some embodiments, the server is associated with a fleet management service that manages routing, etc. for the vehicle.

At 1610, a set of one or more proposed alternative routes are received. In some embodiments, the vehicle (e.g., a computer system for the vehicle) receives a set of proposed alternative routes from a server (e.g., a fleet management service) in connection with management of the vehicle. For example, the server generates the alternative routes based on context information for the vehicle (e.g., location, speed, destination, payload, etc.) and hazard information.

At 1615, information pertaining to the one or more proposed alternative routes are provided. In some embodiments, the system configures a user interface comprising the one or more proposed alternative routes. As an example, the user interface comprises an indication of the proposed alternative route(s) as overlays to a unified map. The proposed alternative route(s) may be displayed in a different color than the current route for the vehicle.

At 1620, the system determines whether a user input is received. In response to determining that a user input is not received, process 1600 returns to 1615 and process 1600 iterates over 1615-1620 until a user input is received. In response to determining that the user input is received at 1620, process 1600 proceeds to 1625.

At 1625, the system determines whether an alternative route is selected. For example, the system determines whether the user input corresponds to a selection of an alternate route or an instruction for the system or server to update the route of the vehicle based on one of the proposed alternative routes. In response to determining that an alternative route is selected at 1625, process 1600 proceeds to 1630. Conversely, in response to determining that an alternative route is not selected at 1625, process 1600 proceeds to 1645.

At 1630, an indication that the alternative route is selected is communicated. In some embodiments, in response to determining that an alternative route is selected, the system sends to a server (e.g., a server associated with a fleet management service) of an indication that the alternative route is selected.

At 1635, the route is updated based on the alternative route. For example, the server updates the route and provides the updated route to the vehicle.

At 1645, a determination is made as to whether process 1600 is complete. In some embodiments, process 1600 is determined to be complete in response to a determination no further unified maps are to be generated and provided to a vehicle, no further images are to be displayed on a computer system for the vehicle, the vehicle has reached its destination, the vehicle does not have a payload, the vehicle is disconnected from the server or fleet management service, the bandwidth of a connection between the vehicle and the server is less than a predefined threshold, a user associated with the vehicle (e.g., the driver) turns off the feature for receiving images pertaining to the vehicle or its route, a user has exited the system, a user indicates that process 1600 is to be paused or stopped, etc. In response to a determination that process 1600 is complete, process 1600 ends. In response to a determination that process 1600 is not complete, process 1600 returns to 1605.

Figure 17:
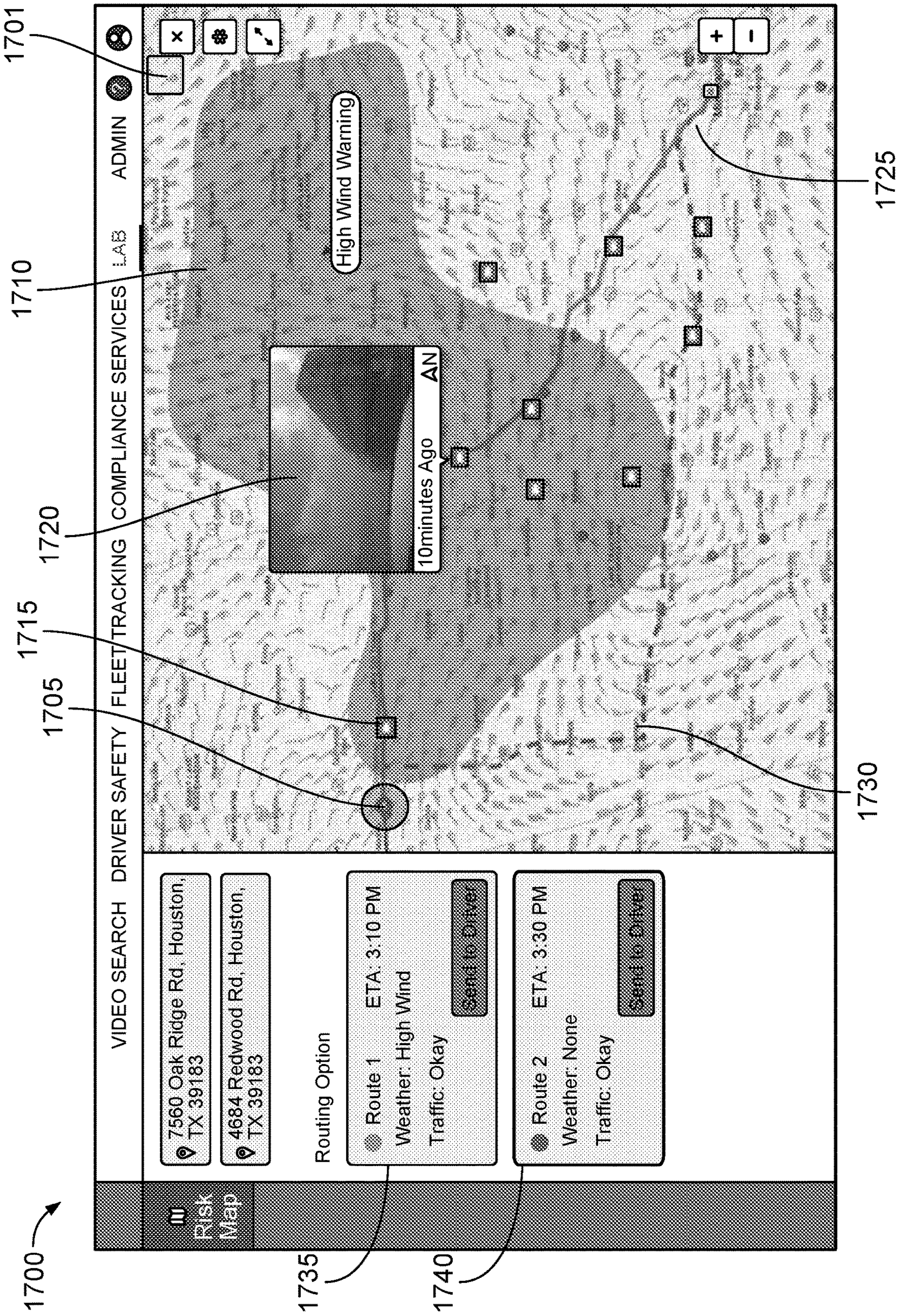
FIG. 17 is an illustration of a unified map pertaining to a geographic area of a vehicle route according to various embodiments.

FIG. 17 is an illustration of a unified map pertaining to a geographic area of a vehicle route according to various embodiments. In some embodiments, unified map 1701 is generated by system 100 of FIG. 1 and/or system 200 of FIG. 2.

In the example shown, unified map 1701 comprises a map of a geographic area. Unified map 1701 comprises an indicator of a driving condition (e.g., a hazard) for one or more managed vehicles. As illustrated, unified map 1701 comprises managed vehicle indicator 1705 corresponding to a current location. The managed vehicle indicator 1705 is provided at a current location of the corresponding managed vehicle. Unified map 1701 further comprises one or more layers comprising driving conditions (e.g., hazard information). For example, unified map 1701 comprises a layer comprising an overlay 1710 of an area in which a high wind is expected (e.g., an area subject to a high wind warning, etc.).

In some embodiments, unified map 1701 comprises one or more current image indicators indicating that a current image of the area is available. For example, unified map 1701 comprises a plurality of current images captured by one or more managed vehicles within the geographic area or from a service providing information obtained from a traffic camera. As an example, unified map 1701 comprises current image indicator 1715. Upon selection of the corresponding current image indicator, image 1720 is displayed, such as overlaid in or around the area at which the current image was captured.

In some embodiments, unified map 1701 is used in connection with determining or selecting active measures. In the example shown, the active measures include a routing of the managed vehicle corresponding to managed vehicle indicator 1705. Unified map 1701 comprises a plurality of indicators respectively associated with a route. For example, unified map 1701 comprises route indicator 1725 for a first route (e.g., a current route) and route indicator 1730 for a second route (e.g., a possible alternative route). As shown in FIG. 17, the route corresponding to route indicator 1730 substantially avoids the high-speed warning corresponding to overlay 1710. In some embodiments, the system automatically determines a low cost (e.g., lower than a predefined cost threshold) or more preferable route (e.g., safer, less significantly impacted by detected driving conditions) such as based on a current location of the managed vehicle, a destination location, and/or a set of identified driving conditions.

In some embodiments, interface 1700 comprises unified map 1701 further includes one or more elements that provide more detailed information pertaining to the routing of the vehicle. For example, the user interface comprises element 1735 in a frame adjacent unified map 1701. Element 1735 comprises detailed information pertaining to the first route, such as estimated time of arrival, status of traffic, wind data, etc. As another example, interface 1700 comprises element 1740 in a frame adjacent unified map 1701. Element 1740 comprises detailed information pertaining to the second route, such as estimated time of arrival, status of traffic, wind data, etc. Elements 1735, 1740 may comprise a button that is configured to implement an active measure. For example, elements 1735, 1740 comprise a button that upon selection causes the system to send to a managed vehicle (e.g., a driver) route information for a selected route.

Figure 18:
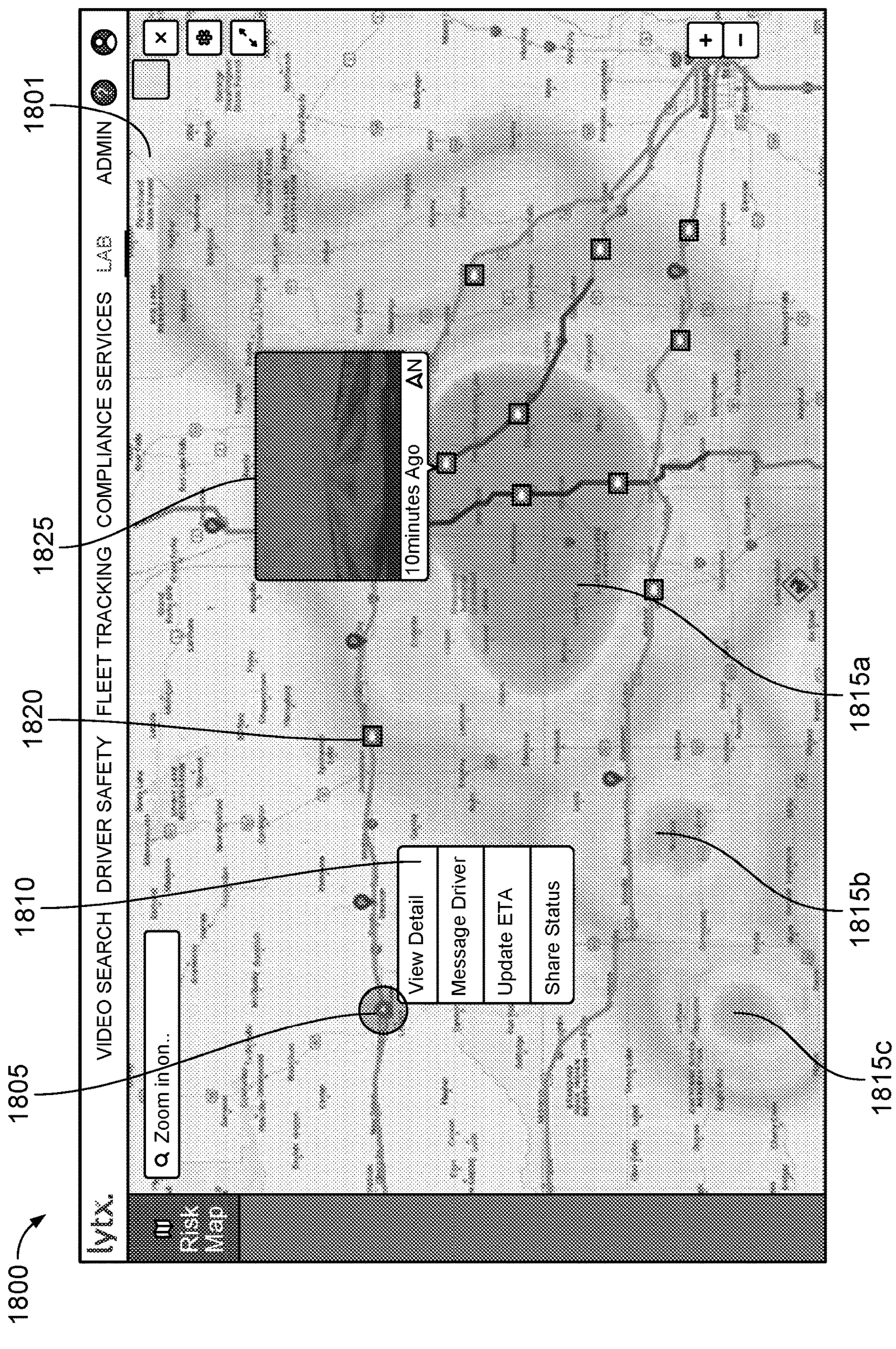
FIG. 18 is an illustration of a unified map pertaining to a geographic area of a vehicle route according to various embodiments.

FIG. 18 is an illustration of a unified map pertaining to a geographic area of a vehicle route according to various embodiments. In some embodiments, unified map 1801 is generated by system 100 of FIG. 1 and/or system 200 of FIG. 2.

In the example shown, unified map 1801 comprises a map of a geographic area. Unified map 1801 comprises an indicator of a driving condition (e.g., a hazard) for one or more managed vehicles. As illustrated, unified map 1801 comprises managed vehicle indicator 1805 corresponding to a current location. The managed vehicle indicator 1805 is provided at a current location of the corresponding managed vehicle. In some embodiments, managed vehicle indicator 1805 is a selectable element. For example, in response to a right click on managed vehicle indicator 1805, element 1810 is displayed. Element 1810 corresponds to a menu of functionality that the user can invoke upon selection. For example, element 1810 includes menu options to view detailed information, message the driver, update the estimated time of arrival (e.g., based on the driving conditions impacting the current route), and share status (e.g., to communicate the status of the managed vehicle to another user or system).

Unified map 1801 further comprises one or more layers comprising driving conditions (e.g., hazard information). For example, unified map 1801 comprises a layer comprising an overlay for storm weather/precipitation levels, including layer areas 1815*a*, 1815*b*, and 1815*c* identifying parts of the geographic area that are expected to be impacted, or are currently being impacted, by a driving condition.

In some embodiments, unified map 1801 comprises one or more current image indicators indicating that a current image of the area is available. For example, unified map 1801 comprises a plurality of current images captured by one or more managed vehicles within the geographic area or from a service providing information obtained from a traffic camera. As an example, unified map 1801 comprises current image indicator 1820. Upon selection of the corresponding current image indicator, image 1825 is displayed, such as overlaid in or around the area at which the current image was captured. The image 1825 can be used to assess the driving conditions of the road, such as to determine whether the roads have been cleared/plowed or whether the roads are impacted by the detected driving condition (and to what extent).

In some embodiments, unified map 1801 is used in connection with determining or selecting active measures. In some embodiments, the system automatically determines whether the current route of the managed vehicle is impacted by the driving condition, and whether to perform an active measure if the current route is impacted by the driving condition. The system may further determine the active measure, such as determining alternate route(s) for the managed vehicle. The system can be configured to automatically implementing the active measure (e.g., re-routing of the managed vehicle), or the system can be configured to display a menu of optional recommended active measures to a user for user selection/confirmation to implement.

Figure 19:
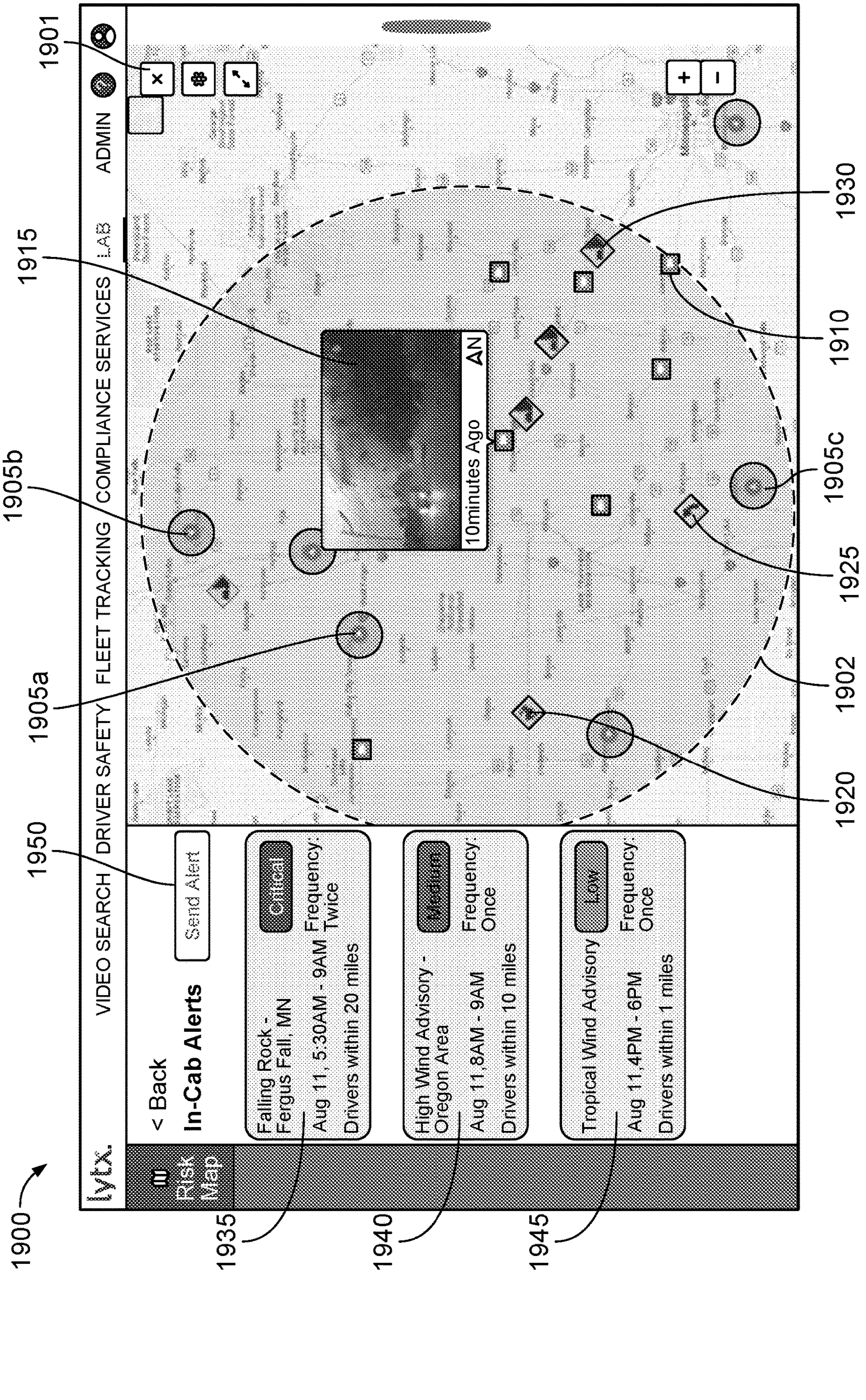
FIG. 19 is an illustration of a unified map pertaining to a geographic area of a vehicle route according to various embodiments.

FIG. 19 is an illustration of a unified map pertaining to a geographic area of a vehicle route according to various embodiments. In some embodiments, unified map of interface 1900 is generated by system 100 of FIG. 1 and/or system 200 of FIG. 2.

In the example shown, unified map of interface 1900 comprises a map of a geographic area. Unified map of interface 1900 comprises an indicator of a driving condition (e.g., a hazard) for one or more managed vehicles. As illustrated, unified map of interface 1900 comprises managed vehicle indicators, such as managed vehicle indicators 1905*a*, 1905*b*, and 1905*c* corresponding to respective locations of the managed vehicles.

In some embodiments, a geographic area is selected by a user. The selected geographic area corresponds to an area of the map for which the user (or system) desires to view driving conditions and/or recommended active measures. In the example shown, geographic area 1902 is selected. As an example, geographic area 1902 corresponds to the Minneapolis metro area and the fleet managers wants to assess driving conditions for managed vehicles in the area.

As illustrated in FIG. 19, unified map of interface 1900 comprises one or more indicators for driving conditions or available information. In some embodiments, the one or more indicators are included in a plurality of layers. For example, each layer is configured to provide a certain type of driving condition, alert, or other info.

Unified map of interface 1900 further comprises one or more layers comprising driving conditions (e.g., hazard information). For example, unified map of interface 1900 comprises a layer comprising an overlay of road data. The layer comprising the road data comprises a plurality of indicators, such as an indicator 1920 corresponding to a possible animal crossing driving condition, indicator 1925 corresponding to a high curvature bend/turn on a road, and/or indicator 1930 corresponding to possible falling rocks along the road. In some embodiments, the system determines to display an indicator on a unified map in response to determining that a collision rate (e.g., based on historical traffic data or other information provided by a service such as a department of transportation) exceeds a threshold collision rate for that driving condition type (e.g., animal crossing, high curvature turn, falling rocks, etc.), or a number of collisions (e.g., in the past predetermined period of time) exceeds a threshold number of collisions. In the example shown, the I-94 road to the Minneapolis city center has several driving condition indicators for falling rocks. Accordingly, a fleet manager may request the system to recommend active measures or otherwise use the system to implement an active measure.

In some embodiments, unified map of interface 1900 comprises one or more current image indicators indicating that a current image of the area is available. For example, unified map of interface 1900 comprises a plurality of current images captured by one or more managed vehicles within the geographic area or from a service providing information obtained from a traffic camera. As an example, unified map of interface 1900 comprises current image indicator 1910. Upon selection of the corresponding current image indicator, image 1915 is displayed, such as overlaid in or around the area at which the current image was captured. Image 1915 can be used to assess the road conditions for the corresponding road.

In some embodiments, unified map of interface 1900 is used in connection with determining or selecting active measures. In the example shown, the active measures include notifying one or more drivers (e.g., managed vehicles) of driving conditions, etc. In some embodiments, the user interface comprising unified map of interface 1900 includes one or more elements that provide more detailed information pertaining to active measures that may be implemented. Unified map of interface 1900 comprises a plurality of elements for recommended/possible alerts to send to the driver(s). The alerts may be automatically generated based on the driving conditions detected in the applicable geographic area of the unified map. For example, the user interface comprises element 1935 in a frame adjacent unified map of interface 1900. Element 1935 comprises an alert to warn drivers of a potential falling rock hazard. Element 1935 may include various configurations of the alert. In some embodiments, the configurations may be adjusted by the fleet manager. The configurations of the alert include a defined set of managed vehicles, parameter(s) to determine managed vehicles to which alert is to be provided (e.g., drivers within a set distance), a severity level of the driving condition (e.g., critical, medium, low, etc.), a date or time to send the alert, etc. As another example, the user interface comprises element 1940 in a frame adjacent unified map of interface 1900. Element 1940 comprises an alert to warn drivers of a high-wind advisory/driving condition. As another example, the user interface comprises element 1945 in a frame adjacent unified map of interface 1900. Element 1945 comprises an alert to warn drivers of a tropical wind advisory/driving condition. Elements 1935, 1940, and 1945 may comprise a button that is configured to implement an active measure. In some embodiments, elements 1935, 1940, and 1945 are selectable. The user interface further comprises button 1950 that is selectable to invoke a communication of the alerts. In some embodiments, in response to button 1950 being selected, the system communicates all alerts in the frame of the user interface (e.g., elements 1935, 1940, and/or 1945). In some embodiments, in response to button 1950 being selected, the system communicates alerts for all driving conditions within a selected geographic area, and the alerts can be automatically generated based on all detected driving conditions, or a selected set of driving conditions, such as based on type of driving condition, severity of driving condition, etc. In some embodiments, in response to button 1950 being selected, the system communicates the alerts that have been selected. For example, if the user selects elements 1935, 1945, then in response to button 1950 being selected, the system sends to the applicable drivers the alerts corresponding to elements 1935, 1945.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a memory;

one or more processors configured to:

obtain context information for one or more vehicles;

obtain a plurality of hazard information from one or more data sources;

determine, based at least in part on the context information and the plurality of hazard information, whether one or more hazards are comprised in a predefined area;

in response to determining that the one or more hazards are comprised in the predefined area, retrieve one or more detailed location data from a subset of the one or more vehicles, the one or more detailed location data comprising information pertaining to a location of the corresponding one or more hazards;

generate one or more layers of a unified map of the predefined area;

determine whether the detailed location data retrieved from the subset of one or more vehicles includes a current image of the location, wherein the current image of the location is captured by a vehicle of the one or more vehicles in response to determination that the vehicle is within a predefined distance threshold of the location, and wherein the current image is captured within a predefined time threshold of a current time;

in response to a determination the detailed location data retrieved from the subset of one or more vehicles includes the current image, configure at least one layer of the one or more layers to include a current image indicator associated with the location; and provide the one or more layers of the unified map to a client via a user interface as overlays to an existing geographic map, wherein upon selection of the current image indicator by a user of the user interface, the current image is displayed.

2. The system of claim 1, wherein detailed location data includes current imagery of the location captured by the one or more vehicles.

3. The system of claim 1, wherein the context information includes a current location and a current route for each of the one or more vehicles.

4. The system of claim 3, wherein the unified map includes one or more indicators for each current route.

5. The system of claim 1, wherein the user interface comprises a selectable element corresponding to a first detailed location data of the one or more detailed location data captured, the selectable element being located relative to the unified map based at least in part on the location of the corresponding one or more hazards.

6. The system of claim 5, wherein the one or more processors are further configured to:

receive a first user input to the user interface, the first user input corresponding to selection of the selectable element; and in response to receiving the first user input, displaying the first detailed location data in a layer overlaying the unified map or in an element displayed on the user interface adjacent to the unified map.

7. The system of claim 6, wherein the one or more detailed location data are pre-fetched before the first user input is received.

8. The system of claim 1, wherein the one or more processors are further configured to:

receive a second user input to the user interface, the second user input corresponding to a request to perform an active measure with respect to a target vehicle of the one or more vehicles; and in response to receiving the second user input, perform the active measure.

9. The system of claim 8, wherein performing the active measure comprises:

determining a new route for a target vehicle based at least in part on the context information and the plurality of hazard information; and updating a current route for the target vehicle to correspond to the new route.

10. The system of claim 9, wherein the updating the current route for the target vehicle comprises:

providing an indication of the new route to a client device associated with the target vehicle.

11. The system of claim 8, wherein performing the active measure comprises providing an alert to a driver of a target vehicle of the one or more vehicles.

12. The system of claim 11, wherein the alert comprises information pertaining to a hazard that the driver is expected to encounter along a current route of the target vehicle.

13. The system of claim 11, wherein the alert comprises at least a first detailed location data.

14. The system of claim 1, wherein retrieving the one or more detailed location data comprises obtaining the one or more detailed location data based at least in part on a position of the one or more vehicles and the plurality of hazard information.

15. A method, comprising:

obtaining, by one or more processors, context information for one or more vehicles;

obtaining a plurality of hazard information from one or more data sources;

determining, based at least in part on the context information and the plurality of hazard information, whether one or more hazards are comprised in a predefined area;

in response to determining that the one or more hazards are comprised in the predefined area, retrieving one or more detailed location data from a subset of the one or more vehicles, the one or more detailed location data comprising information pertaining to a location of the corresponding one or more hazards;

generating one or more layers of a unified map of the predefined area;

determining whether the detailed location data retrieved from the subset of one or more vehicles includes a current image of the location, wherein the current image of the location is captured by a vehicle of the one or more vehicles in response to determination that the vehicle is within a predefined distance threshold of the location, and wherein the current image is captured within a predefined time threshold of a current time;

in response to a determination the detailed location data retrieved from the subset of one or more vehicles includes the current image, configuring at least one layer of the one or more layers to include a current image indicator associated with the location; and providing the one or more layers of the unified map to a client via a user interface as overlays to an existing geographic map, wherein upon selection of the current image indicator by a user of the user interface, the current image is displayed.

16. A computer program product embodied in a non-transitory computer readable medium and comprising computer instructions for:

obtaining, by one or more processors, context information for one or more vehicles;

obtaining a plurality of hazard information from one or more data sources;

determining, based at least in part on the context information and the plurality of hazard information, whether one or more hazards are comprised in a predefined area;

in response to determining that the one or more hazards are comprised in the predefined area, retrieving one or more detailed location data from a subset of the one or more vehicles, the one or more detailed location data comprising information pertaining to a location of the corresponding one or more hazards;

generating one or more layers of a unified map of the predefined area;

determining whether the detailed location data retrieved from the subset of one or more vehicles includes a current image of the location, wherein the current image of the location is captured by a vehicle of the one or more vehicles in response to determination that the vehicle is within a predefined distance threshold of the location, and wherein the current image is captured within a predefined time threshold of a current time;

in response to a determination the detailed location data retrieved from the subset of one or more vehicles includes the current image, configuring at least one layer of the one or more layers to include a current image indicator associated with the location; and providing the one or more layers of the unified map to a client via a user interface as overlays to an existing geographic map, wherein upon selection of the current image indicator by a user of the user interface, the current image is displayed.

* * * * *